US011468533B1

(12) United States Patent
Irey

(10) Patent No.: US 11,468,533 B1
(45) **Date of Patent: *Oct. 11, 2022**

(54) VEHICLE RATING SYSTEM

(71) Applicant: Allstate Insurance Company, Northbrook, IL (US)

(72) Inventor: Grady Irey, Des Plaines, IL (US)

(73) Assignee: Allstate Insurance Company, Northbrook, IL (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/695,906

(22) Filed: Nov. 26, 2019

Related U.S. Application Data

(63) Continuation of application No. 15/018,248, filed on Feb. 8, 2016, now Pat. No. 10,529,046.

(51) Int. Cl.
*G06Q 40/02* (2012.01)
*G06Q 40/08* (2012.01)
*G06Q 50/26* (2012.01)
*G07C 5/08* (2006.01)
*G07C 5/00* (2006.01)

(52) U.S. Cl.
CPC ........... *G06Q 50/265* (2013.01); *G07C 5/008* (2013.01); *G07C 5/0808* (2013.01)

(58) Field of Classification Search
CPC .... G07C 5/0808; G07C 5/008; G06Q 50/265; G06Q 40/08; G06Q 40/02; G06Q 30/02; G06Q 10/0635
USPC ...................................................... 705/325, 4
See application file for complete search history.

(56) References Cited

U.S. PATENT DOCUMENTS

| | | | |
|---|---|---|---|
| 5,797,134 | A | 8/1998 | McMillan et al. |
| 6,052,631 | A | 4/2000 | Busch et al. |
| 6,255,244 | B1 | 7/2001 | Yabunouchi et al. |
| 7,113,853 | B2 | 9/2006 | Hecklinger |
| 7,778,841 | B1 | 8/2010 | Bayer et al. |
| 8,392,334 | B2 | 3/2013 | Hirtenstein et al. |
| 8,560,161 | B1 | 10/2013 | Kator et al. |
| 8,650,093 | B2 | 2/2014 | Seergy et al. |
| 8,686,844 | B1 | 4/2014 | Wine |
| 8,694,328 | B1 | 4/2014 | Gormley |

(Continued)

OTHER PUBLICATIONS

Google Patent Search, dated Mar. 12, 2022. (Year: 2022).*

(Continued)

*Primary Examiner* — Hai Tran
(74) *Attorney, Agent, or Firm* — Polsinelli PC

(57) ABSTRACT

A system may include a telematics device associated with a vehicle, a first computing device, a second computing device associated with a driver of the vehicle, a database, and a driving behaviors analysis server. The driving behaviors analysis server may receive, from the telematics device, driving data of the driver of the vehicle and identify one or more driving behaviors of the driver based on the driving data. The driving behaviors analysis server may assign a driver safety rating to the driver based on the identification and may determine one or more rated vehicles with safety ratings that correspond to or are similar to the driver safety rating assigned to the driver based on parsing data regarding a plurality of rated vehicles in the database. Further, the driving behaviors analysis server may generate and send a customized recommendation to the driver presenting information regarding the one or more rated vehicles.

20 Claims, 10 Drawing Sheets

(56) References Cited

U.S. PATENT DOCUMENTS

| | | | | |
|---|---|---|---|---|
| 8,731,972 | B1 | 5/2014 | Wolf et al. | |
| 2008/0255887 | A1* | 10/2008 | Gruter | G06Q 40/08 705/4 |
| 2011/0166894 | A1 | 7/2011 | Wallach et al. | |
| 2011/0202423 | A1 | 8/2011 | Pratt et al. | |
| 2011/0202471 | A1 | 8/2011 | Scott et al. | |
| 2011/0213628 | A1 | 9/2011 | Peak et al. | |
| 2012/0233014 | A1 | 9/2012 | Banks et al. | |
| 2013/0073321 | A1 | 3/2013 | Hofmann et al. | |
| 2014/0195272 | A1* | 7/2014 | Sadiq | G06Q 40/08 705/4 |
| 2014/0257870 | A1 | 9/2014 | Cielocha et al. | |
| 2014/0278574 | A1 | 9/2014 | Barber | |
| 2015/0187014 | A1* | 7/2015 | Adams | G06Q 40/08 705/4 |
| 2017/0186324 | A1* | 6/2017 | Fish | G06Q 30/018 |

OTHER PUBLICATIONS

Google Scholar Search, dated Mar. 12, 2022. (Year: 2022).*
Google NPL Search, dated Mar. 12, 2022. (Year: 2022).*
Dialog Search, dated May 26, 2022. (Year: 2022).*
Google Scholar Search, dated May 26, 2022. (Year: 2022).*
Google Patents Search, dated May 26, 2022. (Year: 2022).*
Dec. 11, 2019 U.S. Notice of Allowance and Fees Due—U.S. Appl. No. 15/018,233.
Jun. 2, 2020—U.S. Notice of Allowance—U.S. Appl. No. 15/018,233.
Apr. 18, 2018—U.S. Non-Final Office Action—U.S. Appl. No. 15/018,233.
Apr. 18, 2018—U.S. Non-Final Office Action—U.S. Appl. No. 15/018,248.
Apr. 25, 2018—U.S. Non-Final Office Action—U.S. Appl. No. 15/018,265.
Aug. 27, 2018—U.S. Final Office Action—U.S. Appl. No. 15/018,248.
Aug. 28, 2018—U.S. Final Office Action—U.S. Appl. No. 15/018,233.
Aug. 28, 2018—U.S. Final Office Action—U.S. Appl. No. 15/018,265.
May 15, 2018 U.S. Non-Final Office Action—U.S. Appl. No. 15/018,231.
Jan. 22, 2019—U.S. Final Office Action—U.S. Appl. No. 15/018,231.
Dealer Guide to NHTSA's 5-Star Safety Rating Label, National Automobile Dealers Association, http://www.nada.org/NR/rdonlyres, pp. 1-2.
Dealer Guide to NHTSA's 5-Star Safety Rating Label, National Automobile Dealers Association, pp. 1-2.
Insurance Institute for Highway Safety, Highway Loss Data Institute, Highway Safety Research & Communications, IIHS Safety Awards, <http://www.iihs.org/iihs/ratings>; pp. 1-3.
RAA-Royal Automobile Association of South Australia, http://www.raa.com.au/, pp. 1-3.
RAC for the Better, Used Car Safety Ratings | How safe is your car? | RAC WA, <http://rac.com.au/news-community/road-safety-and-transport/safe-cars/how-safe-is-your-car/used-car-safety-ratings>; printed Mar. 16, 2015, pp. 1-2.
RIGHTCAR.govt.nz, New and Used Car Reviews | Vehicle Ratings | RightCar NZ, printed Mar. 16, 2015, p. 1.
Used Car Safety Ratings—How Safe is Your Car—http://rac.com.au/news-community, Last Visited Mar. 16, 2015.
Welcome to USAA!—https://www.usaa.com/inet/pages/advice_auto_main?showtab=tabBuying&akredirect=true, Last Visited Mar. 16, 2015.
Welcome to USAA! <https://www.usaa.com/inet/pages/advice_auto_main?showtab=tabBuying&akredirect=true>, Copyright © 2013 USAA | 143195, Printed Mar. 16, 2015, p. 1.
Jul. 2, 2019—U.S. Non-Final Office Action—U.S. Appl. No. 15/018,248.
Jul. 3, 2019—U.S. Non-Final Office Action—U.S. Appl. No. 15/018,265.
Jul. 8, 2019—U.S. Non-Final Office Action—U.S. Appl. No. 15/018,233.
Sep. 18, 2019—U.S. Notice of Allowance—U.S. Appl. No. 15/018,265.
Sep. 19, 2019—U.S. Notice of Allowance—U.S. Appl. No. 15/018,248.

* cited by examiner

FIG. 9A
FIG. 9B
700
702
VEHICLE RATING
RESIDUAL VALUE
We have identified your driving behaviors for the past year.
You have engaged in hard braking, sharp turns, inconsistent acceleration, speeding, and the like. We have identified that your brake pads have been severely damaged. Based on your driving behaviors, we have determined that the residual value of your vehicle is currently $5,000.
We recommend selling your vehicle
View options for selling
700
702
VEHICLE RATING
RESIDUAL VALUE
We have identified your driving behaviors for the past year.
You have engaged in safe driving behaviors, including driving at posted speed limits, slow turns, and safe braking. Your vehicle is in great condition. Based on your driving behaviors, we have determined that the residual value of your vehicle is currently $20,000.
We recommend waiting 5 more months before selling your vehicle
View options for selling

VEHICLE RATING SYSTEM

CROSS REFERENCE TO RELATED APPLICATIONS

This application is a continuation of U.S. patent application Ser. No. 15/018,248, filed Feb. 8, 2016, which is herein incorporated by reference in its entirety.

BACKGROUND

Insurance companies may employ telematics devices installed in vehicles to monitor and analyze driving performance of drivers insured by the insurance companies. Based on the data collected by such devices, insurance companies may evaluate the driving behaviors of drivers to assess their risk and determine an appropriate insurance cost and premium for each driver. In this way, insurance companies may additionally provide benefits to drivers that engage in safe driving behaviors.

In some cases, drivers may be interested in purchasing or leasing new or preowned vehicles. Drivers may wish to obtain information regarding new or preowned vehicles prior to purchase, such as information regarding vehicle quality, performance, engine power, interior features, exterior features, and the like. Drivers may rely on information and vehicle ratings from consumer reports, surveys, and market research in order to determine which vehicle to acquire. For example, a driver may consult automotive ratings and look at which vehicles were rated the best for various features.

However, current resources for vehicle ratings may be lacking and might not provide a complete picture of vehicle safety to drivers. In some cases, drivers may be particularly interested in vehicle safety as it pertains differently to each driver. For example, one driver may be a faster driver and may take more risks than other drivers. On the other hand, another driver may naturally drive slower than most drivers and take fewer risks when driving. In such cases, certain vehicles may be better suited or safer for some drivers (e.g., fast drivers) rather than other drivers (e.g., slow drivers). Nevertheless, conventional vehicle ratings might not account for different drivers exhibiting a variety of driving behaviors. For example, a driver may purchase or lease a vehicle that is not appropriately suited for him or her, which may result in unsafe driving. Unsafe driving may lead to accidents, which may be harmful and costly.

In light of the above, there may be a demand for new systems, methods, and devices that leverage telematics devices and data obtained therefrom to provide drivers with relevant information for vehicle safety in order to facilitate vehicle purchasing and leasing decisions.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure describe computerized methods, systems, devices, and apparatuses for a vehicle rating system that provide drivers with customized recommendations of one or more rated vehicles based on driving behaviors collected by telematics devices. For example, the vehicle rating system may assign safety ratings to drivers and identify one or more rated vehicles with safety ratings that match a driver's driving behaviors, as well as the driver's own safety ratings.

The disclosure describes a system comprising a telematics device associated with a vehicle having one or more sensors arranged therein, a first computing device associated with a driver of the vehicle, a database storing data regarding a plurality of rated vehicles, and a driving behaviors analysis server, comprising hardware including a processor and memory. The driving behaviors analysis server may be configured to receive, from the one or more sensors and via the telematics device, driving data of the driver of the vehicle from the telematics device, identify one or more driving behaviors of the driver based on the driving data, assign a driver safety rating to the driver based on the identification of the one or more driving behaviors, determine one or more rated vehicles with safety ratings that correspond to the driver safety rating assigned to the driver based on parsing the data regarding the plurality of rated vehicles in the database, generate a customized recommendation for the driver, wherein the customized recommendation presents information regarding the determined one or more rated vehicles with safety ratings that correspond to the driver safety rating, and transmit the customized recommendation to the first computing device associated with the driver.

The disclosure also describes an apparatus comprising at least one processor, a network interface configured to communicate, via a network, with a telematics device associated with a vehicle having one or more sensors arranged therein and a first computing device associated with a driver, and a memory storing computer-readable instructions that, when executed by the at least one processor, cause the apparatus to receive driving data of the driver of the vehicle from the one or more sensors and via the telematics device, identify one or more driving behaviors of the driver based on the driving data, assign a driver safety rating to the driver based on the identification of the one or more driving behaviors, determine one or more rated vehicles with safety ratings that correspond to the driver safety rating assigned to the driver based on parsing data regarding a plurality of rated vehicles in the database, generate a customized recommendation for the driver, wherein the customized recommendation presents information regarding the determined one or more rated vehicles with safety ratings that correspond to the driver safety rating, and transmit the customized recommendation to the first computing device associated with the driver.

In addition, aspects of this disclosure provide a method that includes receiving driving data of a driver of a vehicle from a telematics device associated with the vehicle having one or more sensors arranged therein, identifying, by one or more computing devices, one or more driving behaviors of the driver based on the driving data, assigning, by the one or more computing devices, a driver safety rating to the driver based on the identification of the one or more driving behaviors, determining, by the one or more computing devices, one or more rated vehicles with safety ratings that correspond to the driver safety rating assigned to the driver based on parsing data regarding a plurality of rated vehicles, generating, by the one or more computing devices, a customized recommendation for the driver, wherein the customized recommendation presents information regarding the determined one or more rated vehicles with safety ratings that correspond to the driver safety rating, and transmitting, by the one or more computing devices, the customized recommendation to the driver.

The methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
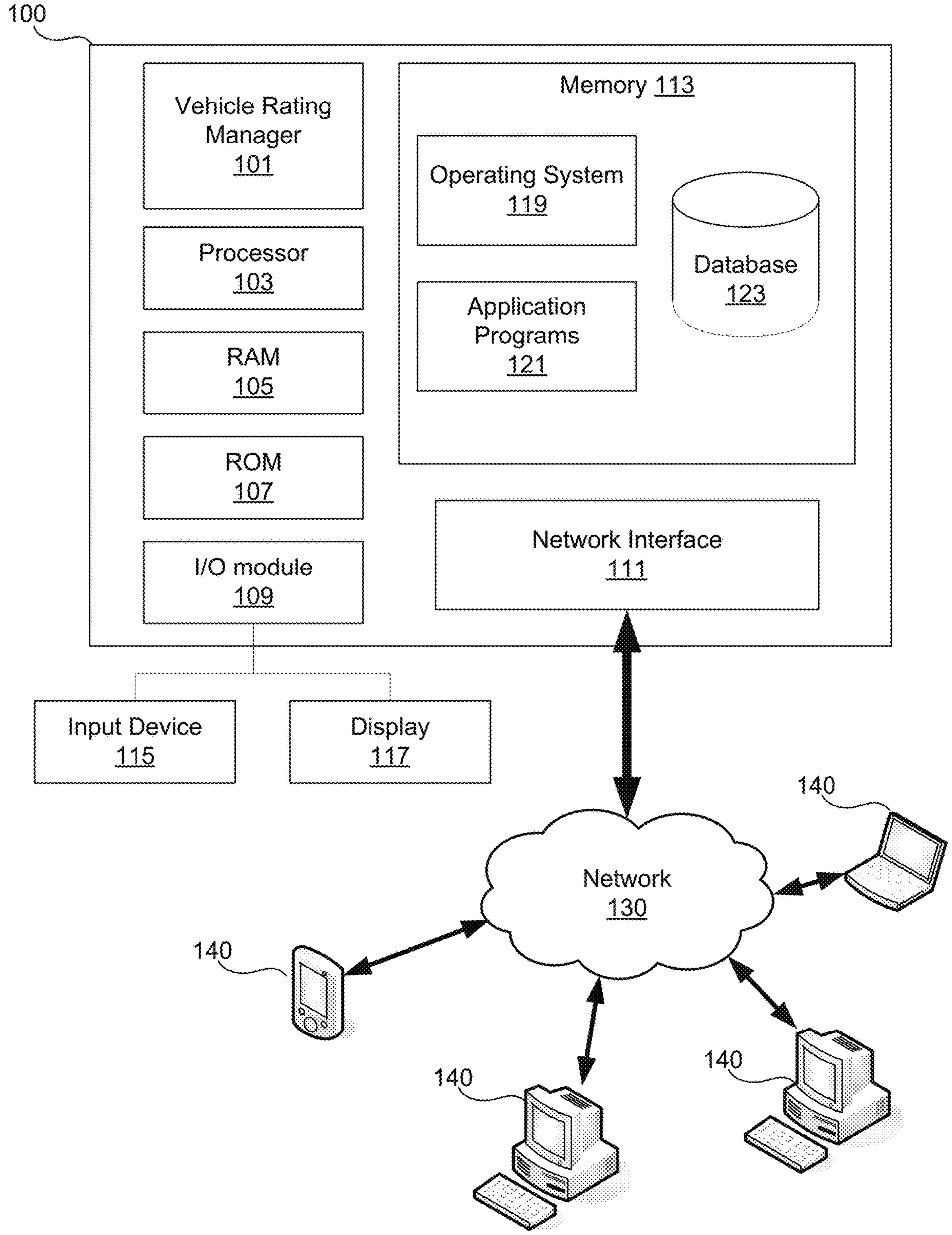
FIG. 1 depicts a block diagram of an example vehicle rating device that may be used in accordance with one or more example embodiments.

In accordance with various aspects of the disclosure, computerized methods, systems, devices, and apparatuses are disclosed that provide vehicle ratings and generate recommendations for drivers. In particular, the present disclosure teaches a vehicle rating system that may be beneficial in providing drivers with vehicle ratings and customized recommendations of rated vehicles for drivers based on driver safety ratings. For example, the vehicle rating system may rate each vehicle according to safety based on the frequency of accidents, severity of accidents, and the driving behaviors of each driver of a particular vehicle type.

In some embodiments, each driver may also be rated according to his or her driving behaviors while driving a vehicle. That is, the vehicle rating system may receive a driver's driving data which may be collected by one or more sensors coupled to the vehicle while the driver is driving. The driving data may include real-time data, such as the driver's speeds, accelerations, braking, GPS coordinates, and the like. Based on the driving data, the vehicle rating system may determine one or more driving behaviors of the driver, such as whether the driver is speeding or driving slow, whether the driver is taking sharp turns, braking hard, and the like. In other words, the vehicle rating system may identify whether or not the driver is taking additional risks while driving, which in return may compromise the driver's safety in his or her vehicle.

After determining specific driving behaviors, the vehicle rating system may assign a driver safety rating to the driver. In some cases, the safety rating may comprise a grade or one or more numerical values based on the driver's previous driving history, driving patterns, driving behaviors, and the like. For example, the vehicle rating system may assign a safety rating of A to a driver because the driver exhibits safe driving behaviors. In some cases, an insurance provider may predetermine certain driving behaviors that are indicative of safe driving. For example, driving behaviors that are indicative of safe driving may include slow turns, driving at or below (or within a predetermined threshold of) posted speed limits, safe braking, consistent acceleration, steady steering, safe lane changing, maintaining safe distances from other vehicles while driving, and the like.

After assigning a safety rating to a driver, the vehicle rating system may determine one or more rated vehicles with safety ratings that correspond to or are similar to the driver safety rating assigned to the driver. For example, different vehicles may be rated accordingly for various features, such as trim levels, traction control, fuel economy, engine power, frequency of accidents, severity of accidents, and likelihood of accidents. In some embodiments, an insurance provider may maintain information regarding accidents and vehicle crashes of drivers who are insurance policy holders, and the vehicle rating system may utilize this information to rate vehicles accordingly. For example, the vehicle rating system may determine a value corresponding to the frequency of accidents for a particular vehicle based on a plurality of drivers who drive the same type of vehicle (e.g., a vehicle of the same make, model, or year). Accident frequency may indicate a number of accidents which occur for a certain vehicle type per unit of time (e.g., per year). Accident severity may also be considered and may include an amount of damage (e.g., in dollars) to the vehicle, whether an injury to a driver or passenger occurred, and the like.

In some embodiments, the vehicle rating system may be able to rate different vehicle types based on how many accidents each driver has had over the predetermined period of time. Furthermore, the vehicle rating system may determine how severe each accident is for each driver. For example, a driver may be in several accidents over a predetermined period of time, but the severity of each accident may vary. Thus, the vehicle rating system may determine a value for accident severity based on the data regarding accidents and vehicle crashes of insured drivers. In some cases, the vehicle rating system may analyze the data on accidents with and/or without injuries (e.g., non-injury accidents) and accidents with and/or without fatalities to determine the severity of accidents. For example, the vehicle rating system may analyze the accident data to determine where collisions occurred in each vehicle, whether or not the driver and/or one or more passengers were injured in each vehicle, whether or not the driver and/or one or more passengers were wearing seatbelts in each vehicle, and the like.

The vehicle rating system may also assess the likelihood or probability of accidents for a certain vehicle based on previous accident data. In some cases, the vehicle rating system may predict how likely a driver of a vehicle is to get into an accident based on the driver's previous accidents and driving history and based on data from actual accidents that have occurred in vehicles with a same or similar make, model, and/or year as the driver's vehicle. For example, the vehicle rating system may determine the likelihood of accidents for a latest model of a vehicle of a new year based on statistical analysis of accidents that have occurred for drivers of vehicles of the same model in previous years.

In addition to the frequency of accidents, the severity of accidents, and the likelihood of accidents, the vehicle rating system may also take into account driving behaviors for a plurality of drivers of a vehicle type and utilize this information to determine vehicle safety ratings for different vehicle types. The vehicle rating system may also provide customized recommendations of vehicles and/or vehicle features to drivers based on each individual's driving behaviors.

In some embodiments, drivers may be better suited for different vehicles based on their particular driving behaviors and safety ratings. For example, a first driver may be a fast driver (e.g., accelerate quickly, brake hard, or the like) and may be better suited for and/or prefer a vehicle with better performance and speed. That is, the first driver may be better suited for a two door vehicle (e.g., a sports car) rather than a sedan or a sports utility vehicle (SUV). Even with a range of different sports cars from which to choose, the first driver may be interested in having a vehicle that specifically matches his or her own driving data. The vehicle rating system may be able to provide this information at a granular level and generate recommendations to drivers that are customized accordingly for each particular driver.

That is, the vehicle rating system may determine one or more rated vehicles with safety ratings that match or correspond to a driver safety rating assigned to a driver. For example, a driver may demonstrate driving behaviors that are better suited for a particular vehicle. The vehicle rating system may provide recommendations with the one or more rated vehicles to the driver.

In addition to rating vehicles and providing customized recommendations to drivers, the vehicle rating system may help drivers who have purchased or leased vehicles to identify when it is time to sell or trade in their vehicles. That is, different drivers may engage in varying driving behaviors which may affect their respective vehicles accordingly. For example, drivers may each purchase or lease a vehicle and use the vehicle extensively, such as driving more than 5,000 miles, 10,000 miles, 20,000 miles, or another number of miles every year. Some drivers may engage in rough driving behaviors, such as hard braking, sharp turns, inconsistent acceleration, speeding, and the like, in their purchased or leased vehicles. Other drivers may engage in safer driving behaviors, such as slow turns, driving at or below posted speed limits, safe braking, consistent acceleration, and the like, in their purchased or leased vehicles. Thus, the vehicle rating system may assist a driver in determining when his or her vehicle is ready for sale or ready to be traded in based on the driver's driving behaviors and based on the residual value of the vehicle. That is, the vehicle rating system may estimate residual values of vehicles and provide customized recommendations to drivers regarding whether or not the drivers should sell or trade in their vehicles.

Furthermore, the vehicle rating system may also provide drivers with recommendations on when they should no longer be driving. For example, as drivers get older or reach certain ages, they may develop vision or hearing problems, slower reaction times, and/or illnesses that may jeopardize their ability to drive safely. In some cases, elderly drivers may engage in unsafe driving behaviors, such as driving well below posted speed limits (e.g., driving at a speed limit that is more than 30 miles per hour less than the posted speed limit), missing traffic signals, failing to stop at road signs, drifting into other lanes, and the like. These unsafe driving behaviors may lead to dangerous collisions which may result in serious injuries or fatalities. Thus, the vehicle rating system may be able to detect which drivers should no longer be driving based on identifying unsafe driving behaviors and driving patterns. The vehicle rating system may thus provide recommendations to drivers to inform them when they should stop or limit their driving due to unsafe driving behaviors as indicated by their driving histories.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example vehicle rating device 100 that may be used in accordance with aspects of the present disclosure. The vehicle rating device 100 is a specialized computing device programmed and/or configured to perform and carry out aspects associated with requesting and providing vehicle rating services for drivers as described herein. The vehicle rating device 100 may have a vehicle rating manager 101 configured to perform methods and execute instructions as described herein. The vehicle rating manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the vehicle rating manager 101 may refer to the software (e.g., a computer program or application) and/or hardware used to assign vehicle ratings to vehicles, provide drivers with customized recommendations for one or more rated vehicles, estimate residual values of a vehicle, provide recommendations regarding when a driver should stop driving, and the like. Specifically, the vehicle rating manager 101 may be a part of a vehicle rating system that rates vehicles and provides recommendations to drivers. The one or more specially configured processors of the vehicle rating manager 101 may operate in addition to or in conjunction with another general processor 103 of the vehicle rating device 100. In some embodiments, the vehicle rating manager 101 may be a software module executed by one or more general processors 103. Both the vehicle rating manager 101 and the general processor 103 may be capable of controlling operations of the vehicle rating device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the vehicle rating device 100 may provide input data. The I/O module 109 may also be configured to be connected to a display device 117, such as a monitor, television, touchscreen, and the like, and may include a graphics card. The display device 117 and input device 115 are shown as separate elements from the vehicle rating device 100, however, they may be within the same structure.

Using the input device 115, system administrators may update various aspects of the vehicle rating system, such as rules or information related to assigning vehicle ratings to vehicles and providing recommendations to drivers. For example, system administrators may update predefined threshold values, predetermined ranges, predetermined periods of time, and/or information related to estimating residual values of vehicles and determining safe and/or unsafe driving behaviors. On some vehicle rating devices 100, the input device 115 may be operated by users (e.g., drivers associated with a vehicle) to interact with the vehicle rating system, including receiving or submitting information regarding driving data and driving behaviors, requesting and/or receiving customized recommendations, vehicle safety ratings, estimated residual values of vehicles, and recommendations regarding when a driver should stop driving. Drivers may also use the input device 115 to provide and/or update preferences for vehicle rating services, send and/or receive information (e.g., regarding offers for purchasing or leasing vehicles) from third party entities, update account information, and the like, as described herein.

The memory 113 may be any computer readable medium for storing computer executable instructions (e.g., software). The instructions stored within memory 113 may enable the vehicle rating device 100 to perform various functions. For example, memory 113 may store software used by the vehicle rating device 100, such as an operating system 119 and application programs 121, and may include an associated database 123.

The network interface 111 allows the vehicle rating device 100 to connect to and communicate with a network 130. The network 130 may be any type of network, including a local area network (LAN) and/or a wide area network (WAN), such as the Internet. Through the network 130, the vehicle rating device 100 may communicate with one or more computing devices 140, such as laptops, notebooks, smartphones, personal computers, servers, and the like. The computing devices 140 may include at least some of the same components as vehicle rating device 100. In some embodiments the vehicle rating device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a vehicle rating device 100. In other embodiments, the vehicle rating device 100 may include fewer or more elements. For example, the vehicle rating device 100 may use the general processor(s) 103 to perform functions of the vehicle rating manager 101, and thus, might not include a separate processor or hardware for the vehicle rating manager 101. Additionally, or alternatively, the vehicle rating device 100 may be a mobile device (e.g., a smartphone, tablet, and the like) specially configured to perform or carry out aspects of vehicle rating services described herein, and thus, may also include various other components, such as a battery, speaker, and/or antennas (not shown). Also, the vehicle rating device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, and the like). For example, the vehicle rating device 100 may be a vehicle's computer or a device plugged into the vehicle's computer for use in vehicle telematics.

Figure 2:
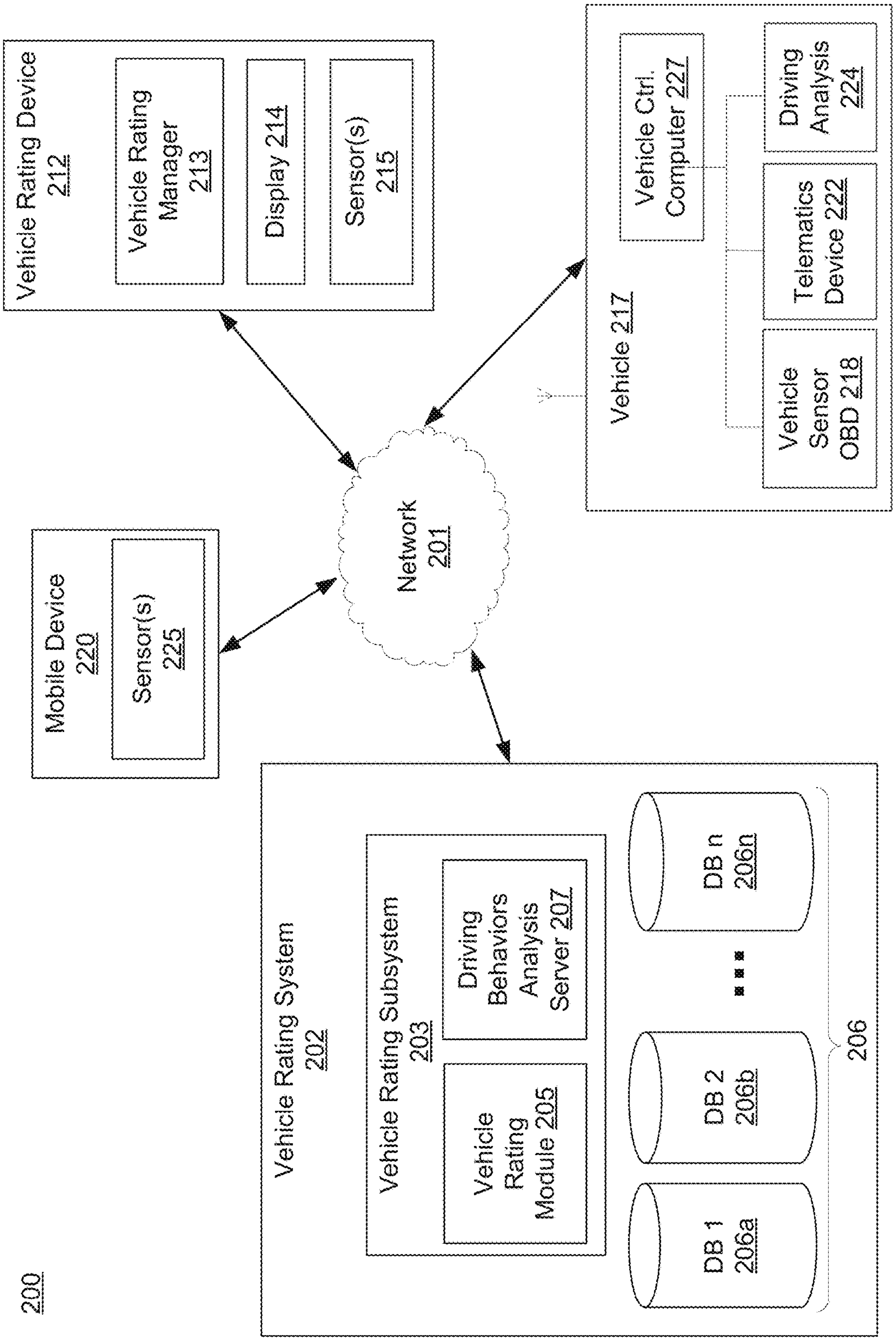
FIG. 2 depicts an example network environment in which various aspects of the present disclosure may be implemented in accordance with one or more example embodiments.

The computerized methods for providing vehicle rating features, assigning safety ratings to vehicles, and providing recommendations to drivers as disclosed herein may be implemented on one or more vehicle rating devices 100 used in various network environments. FIG. 2 illustrates an example network environment 200 for implementing methods in accordance with aspects of the present disclosure.

As shown in FIG. 2, the network environment 200 may include a network 201 configured to connect a vehicle rating system 202, vehicle rating device 212, vehicle 217, telematics device 222, and mobile device 220. The vehicle rating device 212 may be the same as or at least similar to the vehicle rating device 100 described above with reference to FIG. 1. Collectively, these specialized computing devices may form at least a part of a vehicle rating system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers. Accordingly, for example, a mobile device 220 (e.g., a smartphone) or a vehicle rating device 212 of a driver associated with vehicle 217 may communicate, via a cellular backhaul of the network 201, with a vehicle rating system 202 to request or receive vehicle rating information or a recommendation as a part of the vehicle rating service. In another example, the mobile device 220 or the vehicle rating device 212 of the driver of the vehicle 217 may communicate, via the cellular backhaul of the network 201, with the vehicle rating system 202 to request information regarding a residual value of a vehicle or to update account information and/or preferences for the vehicle rating service for the vehicle 217. And in the opposite direction, the vehicle rating system 202 may communicate, via the cellular backhaul of the network 201, with the mobile device 220 or the vehicle rating device 212 to notify the user (e.g., the driver of vehicle 217) of the mobile device 220 or vehicle rating device 212 of a vehicle rating that has been assigned to a vehicle 217, a customized recommendation of one or more rated vehicles for lease or purchase by the driver, or a recommendation for the driver to stop or limit driving due to age or health reasons. In another embodiment, the mobile device 220 and/or vehicle rating device 212 may communicate back and forth with the vehicle rating system 202 over the Internet, such as through a web portal. As shown in FIG. 2, it should be understood that the mobile device 220 or vehicle rating device 212 may connect to the network even if it is removed from the vehicle 217.

In some embodiments, there may be multiple vehicles 217. Although FIG. 2 illustrates only one vehicle 217, the vehicle rating system 202 may be configured to communicate with multiple vehicles 217 simultaneously (e.g., at or around the same time), and the multiple vehicles 217 may be associated with multiple individuals. For example, the multiple vehicles 217 may represent different vehicle types, wherein each vehicle type may be driven by a plurality of drivers. That is, a vehicle 217 may represent a particular vehicle model, vehicle make, and/or vehicle year, in which different drivers may drive different vehicle models and the like. In some cases, there may be a plurality of drivers associated with each vehicle model or type. For example, there may be thousands or hundreds of thousands of drivers who drive a first make and model vehicle (e.g., 4 door mid-sized sedan manufactured by a first manufacturer) and another group of thousands of drivers who drive a second make and model vehicle (e.g., 4 door mid-sized sedan manufactured by a second manufacturer different from the first manufacturer). The vehicle 217 may represent each vehicle model that is driven by a plurality of drivers. The vehicle rating system 202 may receive driving data for multiple vehicles 217 simultaneously, identify driving behaviors for the drivers of the multiple vehicles 217 simultaneously, assign vehicle ratings to each of the multiple vehicles 217 simultaneously, and send recommendations to drivers simultaneously. Also, although FIG. 2 depicts the vehicle 217 as a car, the vehicle 217 may be any type of vehicle, including a motorcycle, bicycle, scooter, drone (or other automated device), truck, bus, boat, plane, helicopter, recreational vehicle, and the like.

In some embodiments, there may be a driver associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. A driver of the vehicle 217 may also be associated with and operate a vehicle rating device 212. In some embodiments, the vehicle rating device 212 may be a specialized mobile device (e.g., mobile phone), a tablet, laptop, personal computer, and the like configured to perform or carry out aspects associated with vehicle rating described herein. For example, the vehicle rating device 212 may be the same as the mobile device 220 depicted in FIG. 2. The vehicle rating device 212 may belong to a driver, individual, or customer of an insurance company who is enrolled in a vehicle rating service. Although only one vehicle rating device 212 is illustrated in FIG. 2, there may be any number of vehicle rating devices 212, wherein each vehicle rating device 212 is associated with at least one driver. The vehicle rating device 212 may further comprise a vehicle rating manager 213, a display 214, and sensors 215. In the case of a vehicle rating device 212 that is installed in or connected to a vehicle 217, the individual is considered to operate that vehicle rating device 212 by performing the installation or connection of that device in or at the vehicle 217.

The vehicle rating device 212 may be configured to execute the vehicle rating manager 213 that presents a user interface (e.g., a graphical user interface for a website, application, software program, and the like) on the display 214. The display 214 may comprise a monitor, television, touchscreen, and the like. The user interface of the vehicle rating manager 213 may allow drivers to access vehicle rating information and receive customized recommendations from the vehicle rating system 202. Drivers may also update account information or preferences for the vehicle rating services provided by the vehicle rating system 202 through the user interface of the vehicle rating manager 213.

The vehicle rating manager 213 may be a self-sufficient program or may be a module of another program, such as a program used to collect and/or evaluate driver information representing actions of a vehicle 217, driving behavior of a driver associated with a vehicle 217, and/or status updates of a vehicle 217. The vehicle rating manager 213 may have access to driving data that is collected by the sensors 215 of the vehicle rating device 212. The vehicle rating manager 213 may be configured in a similar manner as the vehicle rating manager 101 or configured to perform similar functions as those performed by the vehicle rating manager 101. The sensors 215 may comprise various sensors and/or modules that detect driving data, environmental information, and/or other risk-related factors of a driver of a vehicle 217. For example, the sensors 215 may comprise an accelerometer, speedometer, GPS, gyroscope, and the like. In some embodiments, the sensors 215 may detect risk-related factors that may result in a roadside incident involving the vehicle 217.

In some embodiments, the sensors 215 may be capable of detecting and recording various conditions at the vehicle and operational parameters of the vehicle. For example, sensors 215 may detect and store data corresponding to the vehicle's speed, distances driven, rates of acceleration or braking, and specific instances of sudden acceleration, braking, and swerving. Sensors 215 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 215 may detect and store the external driving conditions, for example, external temperature, rain, snow, light levels, and sun position for driver visibility. Sensors 215 also may detect and store data relating to moving violations and the observance of traffic signals and signs by the vehicle 217. Additional sensors 215 may detect and store data relating to the maintenance of the vehicle 217, such as the engine status, oil level, engine coolant temperature, odometer reading, the level of fuel in the fuel tank, engine revolutions per minute (RPMs), and/or tire pressure.

The vehicle 217 also may include one or more cameras and proximity sensors 215 capable of recording additional conditions inside or outside of the vehicle 217. Internal cameras may detect conditions such as the number of the passengers in the vehicle 217, and potential sources of driver distraction within the vehicle (e.g., pets, phone usage, unsecured objects in the vehicle). External cameras and proximity sensors 215 may detect other nearby vehicles, traffic levels, road conditions and roadway types, (e.g., such as expressways, highways, private lanes, and the like), traffic obstructions, traffic controls, animals, cyclists, pedestrians, weather conditions, and other conditions that may factor into driving trip and/or driving data analyses.

The vehicle rating manager 213 may also have access to maintenance data that is collected by the sensors 215 of the vehicle rating device 212. For example, the sensors 215 may comprise car engine sensors, oxygen sensors, temperature sensors, water sensors, coolant sensors, position sensors, oil pressure gauges, and the like. Each of these sensors 215 may be used to monitor various metrics of the vehicle 217 to ensure that the vehicle 217 is properly functioning under safe operating conditions. In some embodiments, the sensors 215 may detect maintenance-related issues in the vehicle 217.

In some embodiments, the vehicle rating manager 213 may be downloaded or otherwise installed onto the vehicle rating device 212 using known methods. Different devices may install different versions of the vehicle rating manager 213 depending on their platform. A driver may launch the vehicle rating manager 213 by, for example, operating buttons or a touchscreen on the vehicle rating device 212. Additionally, or alternatively, the vehicle rating device 212 may be configured to execute a web browser (e.g., an application for accessing and navigating the Internet) to access a web page providing an interface for the vehicle rating system 202. In some embodiments, the vehicle rating device 212 may also be configured to collect information, such as driving data. For example, the vehicle rating manager 213 or another program installed on the vehicle rating device 212 may instruct the vehicle rating device 212 to collect driving data using the various sensors 215 (e.g., accelerometer, speedometer, GPS, car engine sensors, oxygen sensors, temperature sensors, water sensors, coolant sensors, position sensors, oil pressure gauges, and the like). Driving data may include real-time data that is collected by the one or more sensors 218 coupled to the vehicle 217 while the driver is driving. Furthermore, the vehicle rating manager 213 may be able to identify one or more driving behaviors based on the driving data. The driving behaviors for the driver may be based on at least one of driving speed, acceleration, braking, steering, miles driven, road conditions, amount of time driven, and the like. Drivers may exhibit different driving behaviors, such as staying within or going above posted speed limits or engaging in or avoiding sudden braking or sharp turning events while driving vehicle 217. Different driving behaviors may affect a driver's safety rating, a vehicle's safety rating, and residual value of the vehicle 217. The vehicle rating manager 213 or another program may also collect location information, such as GPS coordinates indicating the geographical location of the vehicle rating device 212 and/or vehicle 217.

In some embodiments, the vehicle rating manager 213 may use the collected driving data to determine one or more driving behaviors, assign driver safety ratings to drivers, assign safety rating to vehicles based on driving behaviors of a plurality of drivers, and/or provide customized recommendations to drivers, in accordance with one or more embodiments disclosed herein.

Additionally, FIG. 2 also illustrates a telematics device 222, which may be referred to as a vehicle computing device that is associated with the vehicle 217 and the mobile device 220. In some embodiments, the mobile device 220 and telematics device 222 may communicate with one another (e.g., via Bluetooth). The mobile device 220 may be any mobile device (e.g., a smartphone, tablet, and the like) that is associated with a driver or passenger of the vehicle 217. In particular, the mobile device 220 may belong to a driver of the vehicle 217, wherein the driver is a customer of an insurance provider and enrolled in a service that allows the driver to participate in vehicle rating services. The mobile device 220 may be configured similarly to the vehicle rating device 212 and may interface with the telematics device 222.

The telematics device 222 may be configured to execute a vehicle rating manager 213 that presents a user interface for a customer to provide inputs to and receive outputs from the vehicle rating system 202. The vehicle rating manager 213 may be downloaded or otherwise installed onto the telematics device 222 using known methods. Once installed onto the telematics device 222, a driver may launch the vehicle rating manager 213 by, for example, operating buttons or a touchscreen on the dashboard of the vehicle 217. Additionally, or alternatively, the telematics device 222 may be configured to execute a web browser to access a web page providing an interface for the vehicle rating system 202.

In some embodiments, the telematics device 222 may be a device that is plugged into the vehicle's 217 on-board diagnostic (OBD) system (e.g., plugged in through an OBD II connector) or otherwise installed in the vehicle 217 in order to collect driving data using, e.g., its accelerometer, GPS, gyroscope, or any other sensor (either in the telematics device 222 or the vehicle 217). As mentioned above, this driving data may include data indicative of one or more vehicle metrics, as well as vehicle telematics data or any other data related to events occurring during a vehicle's trip (e.g., an impact to a part of the vehicle 217, a deployed airbag, or other event triggered by a sensor 215 of the vehicle 217). The vehicle 217 may have a GPS installed therein, and therefore, the telematics device 222 may also collect GPS coordinates. Alternatively, the telematics device 222 may include its own GPS receiver.

Further, the telematics device 222 may include multiple devices. For example, the telematics device 222 may include the vehicle's OBD system and other computers of the vehicle 217. The telematics device 222 may be configured to interface with one or more vehicle sensors (e.g., fuel gauge, tire pressure sensors, engine temperature sensors, and the like). For example, the telematics device 222 may be configured to interface with the vehicle sensor 218, which may collect driving data. The driving data collected by vehicle sensor 218 may be stored and/or analyzed within the vehicle 217, such as for example by a driving analysis computer 224 integrated into the vehicle, and/or may be transmitted to one or more external devices. For example, as shown in FIG. 2, sensor data may be transmitted via a telematics device 222 to one or more remote computing devices, such as vehicle rating device 212, mobile device 220, vehicle rating system 202, and/or other remote devices.

The telematics device 222 may also interface with the mobile device 220 via a wired connection (e.g., USB, OBD II connector, and the like) or a wireless connection (e.g., Bluetooth). In some embodiments, there might not be a telematics device 222 installed in the vehicle 217 that is configurable to interface with the vehicle rating system 202, or the telematics device 222 might not be able to communicate with the mobile device 220. Still, in some cases, the telematics device 222 might be configured so that it only communicates with the mobile device 220 within the same vehicle 217.

In some embodiments, both a telematics device 222 and a mobile device 220 (or a vehicle rating device 212) may be employed, whereas in another embodiment, only one of these devices may be used with the vehicle rating system to collect driving data. For example, a driver associated with the vehicle 217 may choose whether he or she wishes to use his or her mobile phone to capture driving data or whether he or she wishes to have a device plugged into the vehicle 217 to collect driving data.

FIG. 2 also illustrates example subsystems within the network environment 200. That is the vehicle rating system 202 may comprise a vehicle rating subsystem 203 and a plurality of databases 206. The vehicle rating subsystem 203 may include one or more application servers, computing devices, and other equipment (e.g., conference bridge equipment) used by company or entity (e.g., insurance provider) personnel to implement and provide the vehicle rating services described herein. For example, the vehicle rating subsystem 203 may include a vehicle rating module 205 that is configured with programmed instructions to assign a vehicle rating to a vehicle 217 based on collected driving data and generate customized recommendations for a driver of the vehicle 217. The vehicle rating module 205 may assign vehicle ratings to a plurality of vehicles and store data regarding the plurality of rated vehicles as one or more records in a database (e.g., database 206) of the vehicle rating system 202, in which the one or more records may be associated with driver or customer records stored in the database. For example, the one or more records may identify a unique identification number for a driver or customer. In another example, the one or more records may include a field for a vehicle type, a field for the vehicle rating, and multiple fields for each feature of the vehicle type. The vehicle rating module 205 may update the vehicle rating assignment by inserting one or more identifiers in the fields of the one or more records. Furthermore, the vehicle rating module 205 may also update or store information regarding vehicle information, vehicle ratings, driving behaviors, driver safety ratings, and the like in one or more databases 206.

The vehicle rating subsystem 203 may include functionality that may be distributed among a plurality of computing devices. For example, the vehicle rating subsystem 203 may comprise further subsystems, including client-side subsystems and server-side subsystems. The client-side subsystem may interface with the vehicle rating device 212, telematics device 222, and/or mobile device 220, whereas the server-side subsystem may interface with application servers and computing devices which handle a variety of tasks related to the overall management of vehicle rating services. For example, the subsystem 203 may also include one or more servers, such as a driving behaviors analysis server 207. The driving behaviors analysis server 207 may be configured to perform vehicle rating services as described herein. For example, the driving behaviors analysis server 207 may analyze collected driving data for a driver of the vehicle 217, identify one or more driving behaviors, rate the vehicle 217 based on the one or more driving behaviors, and/or provide a customized recommendation to the driver of the vehicle 217.

The subsystems, application servers, and computing devices of the vehicle rating subsystem 203 may also have access to the plurality of databases 206. In some embodiments, the plurality of databases 206 may be incorporated into the vehicle rating subsystem 203 or may be separate components in the vehicle rating subsystem 203. As an example, the plurality of databases 206 (e.g., databases 206*a*-206*n*) may include one or more of a vehicle ratings database, a driver safety rating database, a driving behaviors database, an accounts and billing database, a vehicle information database, a driving history database, and other types of databases. That is, the databases 206*a*-206*n* may store one or more of vehicle ratings, driver safety ratings, driving behaviors, accounts and billing information, vehicle information, driving history information, and other types of data. The data stored in the plurality of databases 206 may be collected and compiled by the vehicle rating device 212, the telematics device 222, the vehicle rating subsystem 203, or by servers and subsystems within the vehicle rating subsystem 203.

Figure 3:
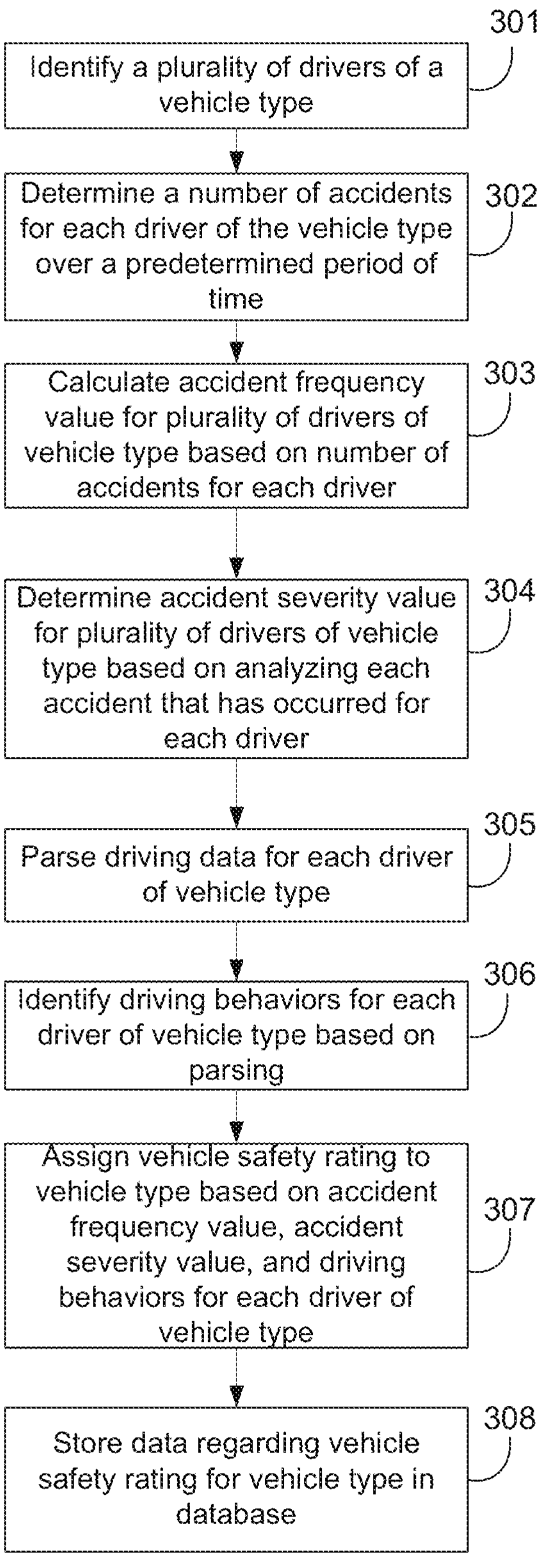
FIG. 3 depicts a flow diagram of example method steps for assigning vehicle ratings in accordance with one or more example embodiments.

FIG. 3 illustrates a flow diagram of an example method in accordance with steps of the present disclosure. In particular, FIG. 3 illustrates example method steps for identifying a plurality of drivers of a particular vehicle type, determining an accident frequency value, determining an accident severity value, identifying driving behaviors for each driver of the vehicle type, and assigning a vehicle safety rating to the vehicle type based on the accident frequency value, the accident severity value, and the driving behaviors for each driver of the vehicle type. The steps of FIG. 3 may be performed by subsystems, application servers, and computing devices of the vehicle rating system 202 (e.g., vehicle rating subsystem 203). One or more of the steps of FIG. 3 may be performed by executing a vehicle rating program (e.g., a vehicle rating mobile application) and/or by operating a particularly configured computing device of the vehicle rating system 202. As a result of the method of FIG. 3, a driver, at vehicle rating device 212 (e.g., and/or at mobile device 220) and associated with vehicle 217, may be provided with access to a database storing data regarding a plurality of rated vehicles, wherein each vehicle type comprises a vehicle safety rating.

The method of FIG. 3 may begin with a step 301 of identifying a plurality of drivers of a vehicle type. In some embodiments, the vehicle rating system 202 may identify a plurality of drivers of a vehicle type, wherein each driver may be associated with a respective vehicle that is categorized by the vehicle type. The vehicle type may indicate a vehicle of a similar or same vehicle model, vehicle make, and year, and the vehicle of each driver may be insured by an insurance provider. For example, the vehicle type (e.g., vehicle type 1) may be a particular year, make, and model of the vehicle. The vehicle rating system may determine that there are 5,000 drivers who drive a vehicle of vehicle type 1 and are insured by an insurance provider. At step 302, the vehicle rating system may determine a number of accidents for each driver of the vehicle type over a predetermined period of time. For example, the vehicle rating system 202 may determine how many accidents each of the 5,000 drivers (e.g., of the vehicle of vehicle type 1) have been involved in over a predetermined period of time (e.g., over a few months, over a year, over two years, or another period of time). In some embodiments, the number of accidents for each driver may include collisions, crashes, and automobile rollovers for the vehicle type over a year.

At step 303, the vehicle rating system 202 may calculate an accident frequency value for the plurality of drivers of the vehicle type based on the number of accidents for each driver of the vehicle type. For example, the vehicle rating system 202 may determine the frequency of accidents for the vehicle of vehicle type 1 based on how many accidents each driver has been involved in over a predetermined period of time. At step 304, the vehicle rating system 202 may determine an accident severity value for the plurality of drivers of the vehicle type. For example, the vehicle rating system 202 may determine the accident severity value based on analyzing each accident that has occurred for each driver of the vehicle type. In some embodiments, the vehicle rating system 202 may analyze at least one of vehicle damages, vehicle repair times, injuries, non-injuries, and fatalities for each accident that has occurred for each driver of the vehicle type. After obtaining the accident severity value, at step 305, the vehicle rating system 202 may parse driving data for each driver of the vehicle type. For example, the driving data for each driver may be stored in a database 206, and the vehicle rating system 202 may examine the driving data, which may comprise real-time data that is collected by one or more sensors coupled to each driver's vehicle while the driver is driving.

At step 306, the vehicle rating system 202 may identify driving behaviors for each driver of the vehicle type. For example, the vehicle rating system 202 may identify driving behaviors for each driver based on at least one of driving speeds, acceleration, braking, steering, miles driven, road conditions, amount of time driven, and the like. The driving behaviors may represent patterns in the driving data that are repeated over a predetermined period of time. In some embodiments, the driving behaviors for each driver may indicate whether the driver engages in speeding or driving slow, whether the driver is taking sharp turns, whether the driver brakes suddenly, and the like.

At step 307, the vehicle rating system 202 may assign a vehicle safety rating to the vehicle type based on the accident frequency value, the accident severity value, and the driving behaviors for each driver of the vehicle type. For example, the vehicle rating system 202 may determine a vehicle safety rating based on normalization of the driving behaviors from each driver of the vehicle type. Furthermore, the vehicle rating system 202 may also calculate a likelihood of accidents value for the vehicle type based on a statistical analysis of the driving behaviors, driving history, and accident data for each driver of the vehicle type. The likelihood of accidents value may indicate how likely it is for any driver of the vehicle type to get into an accident when driving.

At step 308, the vehicle rating system 202 may store data regarding the vehicle safety rating for the vehicle type in a database. For example, the vehicle rating system 202 may store the vehicle safety rating in a vehicle ratings database 206, wherein the database 206 may be accessible to one or more computing devices.

Figure 4:
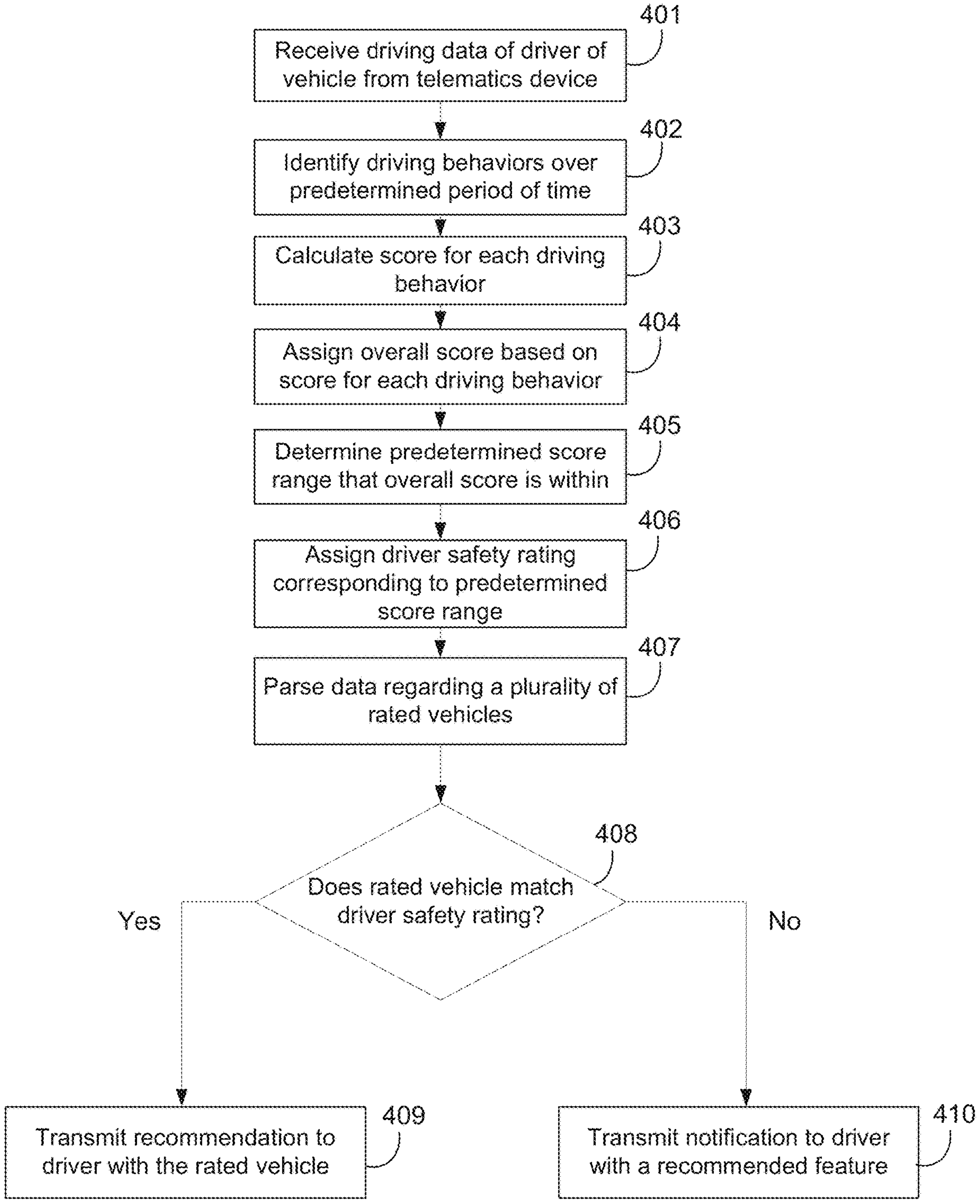
FIG. 4 depicts a flow diagram of example method steps for providing customized recommendations of one or more rated vehicles to drivers in accordance with one or more example embodiments.

FIG. 4 illustrates a flow diagram of an example method in accordance with aspects of the present disclosure. In particular, FIG. 4 illustrates example method steps for identifying a driver's driving behaviors, assigning a driver safety rating based on the driving behaviors, identifying one or more rated vehicles that match the driver safety rating, and providing customized recommendations to the driver. The steps of FIG. 4 may be performed by subsystems, application servers, and computing devices of the vehicle rating system 202 (e.g., vehicle rating subsystem 203). One or more of the steps of FIG. 4 may be performed by executing a vehicle rating program (e.g., a vehicle rating mobile application) and/or by operating a particularly configured computing device of the vehicle rating system 202. As a result of the method of FIG. 4, a driver, at vehicle rating device 212 (e.g., and/or at mobile device 220) and associated with vehicle 217, may be provided with a recommendation regarding one or more rated vehicles or one or more vehicle features.

The method of FIG. 4 may begin with a step 401 of receiving driving data. For example, the vehicle rating system 202 may receive driving data for a driver of the vehicle 217. In some embodiments, the driving data of the driver of vehicle 217 may be collected over a period of time by the telematics device 222, vehicle rating device 212, or mobile device 220. Driving data may include real-time data that is collected by one or more sensors (e.g., sensors 218) coupled to the vehicle 217 while the driver is driving. For example, driving data may include vehicle telematics data, along with location information, such as GPS coordinates, indicating the geographical location of the driver in the vehicle 217. At step 402, the vehicle rating system may identify driving behaviors over the predetermined period of time based on the driving data. For example, the vehicle rating system 202 may identify one or more driving behaviors for the driver based on at least one of driving speeds, acceleration, braking, steering, miles driven, road conditions, amount of time driven, and the like. The driving behaviors may represent patterns in the driving data that are repeated over the predetermined period of time. In some embodiments, the driving behaviors may indicate whether the driver engages in speeding or driving slow, whether the driver is taking sharp turns, whether the driver brakes suddenly, and the like. In some embodiments, the predetermined period of time may represent a billing period associated with an insurance policy of the driver or a period of time (e.g., a day, a week, a month, a year, etc.) set by an insurance provider.

At step 403, the vehicle rating system may calculate a score for each driving behavior. For example, the vehicle rating system 202 may calculate a score for speed, braking, steering, turn signals, miles driven, amount of time driven at night, amount of time driven during daytime, and the like. At step 404, the vehicle rating system 202 may assign an overall driving score for the driver based on the score for each of the one or more driving behaviors. For example, the vehicle rating system 202 may compute an overall driving score for the driver by totaling the driving behavior scores. At step 405, the vehicle rating system 202 may determine a predetermined score range that the overall driving score is within. In some cases, an insurance provider may set certain predetermined score ranges that correspond to safe driving behaviors, and the vehicle rating system 202 may use these predetermined score ranges to determine if a driver's scores are indicative of safe driving. For example, the vehicle rating system 202 may determine that the overall driving score is within a range of 60-70, 71-80, 81-90, or 91-100, wherein each range may be predetermined by the insurance company. The example for calculating the overall driving score above is merely one example method of calculating the overall driving score for a driver. More or fewer factors may be considered without departing from the invention. Further, one or more weighting factors may be used in scoring each behavior or in determining the overall score. Further still, various other methods of calculating an overall score may be used without departing from the invention.

At step 406, the vehicle rating system 202 may assign a driver safety rating corresponding to the predetermined score range to the driver. In some cases, the predetermined score range may correspond to a driver safety rating of a certain level or of a certain range. For example, if the predetermined score range is within a range of 71-80, the driver safety rating may be represented as a grade of C. If the predetermined score range is within a range of 81-90, the driver safety rating may be represented as a grade of B. If the predetermined score range is within a range of 91-100, the driver safety rating may be represented as a grade of A. The vehicle rating system 202 may assign the driver safety rating as a grade or a numerical value and store the driver safety rating in a database (e.g., database 206) accordingly.

At step 407, the vehicle rating system 202 may parse data regarding a plurality of rated vehicles. For example, the vehicle rating system 202 may parse data stored in a database 206 in order to identify one or more rated vehicles. In some embodiments, the database storing the data regarding the plurality of rated vehicles may include a safety rating assigned to each rated vehicle based on or more vehicle features, frequency of accidents, severity of accidents, and likelihood of accidents for a plurality of drivers associated with each rated vehicle. At step 408, the vehicle rating system 202 may determine if a rated vehicle of a certain safety rating matches with a driver safety rating. That is, the vehicle rating system 202 may determine if one or more rated vehicles with certain safety ratings correspond to or are similar to the driver safety rating. In order to determine if the one or more rated vehicles with certain safety rating match the driver safety rating, the vehicle rating system 202 may identify driving behaviors for each of a plurality of drivers associated with each rated vehicle in a database 206. The vehicle rating system 202 may then determine a first subset of drivers (out of the plurality of drivers for each rated vehicle) with driving behaviors that correspond to one or more driving behaviors of the driver of the vehicle. The vehicle rating system 202 may subsequently identify one or more rated vehicles associated with the first subset of drivers. In other words, the vehicle rating system 202 may be able to match a driver with one or more rated vehicles based on matching the driver's driving behaviors with behaviors of a first subset of drivers.

If the vehicle rating system 202 is able to match the driver safety rating with one or more rated vehicles, then the method in this example proceeds to step 409. At step 409, the vehicle rating system 202 may generate and transmit a customized recommendation with the one or more rated vehicles to the driver. That is, the customized recommendation may present information regarding the one or more rated vehicles with safety ratings that correspond to or are similar to the driver safety rating. In some embodiments, the driver may request for information comprising one or more preferences regarding a new vehicle for lease or purchase by the driver. Thus, the vehicle rating system 202 may generate the customized recommendation based on the one or more preferences requested by the driver. The driver may receive the customized recommendation at the vehicle rating device 212 or mobile device 220.

If the vehicle rating system 202 is unable to match the driver safety rating with one or more rated vehicles, then the method in this example proceeds to step 410. At step 410, the vehicle rating system 202 may transmit a notification to the driver indicating a vehicle feature that may be beneficial to the driver based on analysis of the driver's driving behaviors. For example, the vehicle rating system 202 may identify that the driver drives faster than most drivers and may recommend that based on the driver's driving behaviors (e.g., fast driving), the driver should look for a vehicle with better traction control to prevent loss of road grip when the driver is speeding. Thus, the vehicle rating system 202 may be able to provide customized recommendations that are useful for each driver according to his or her specific driving behaviors.

Figure 5:
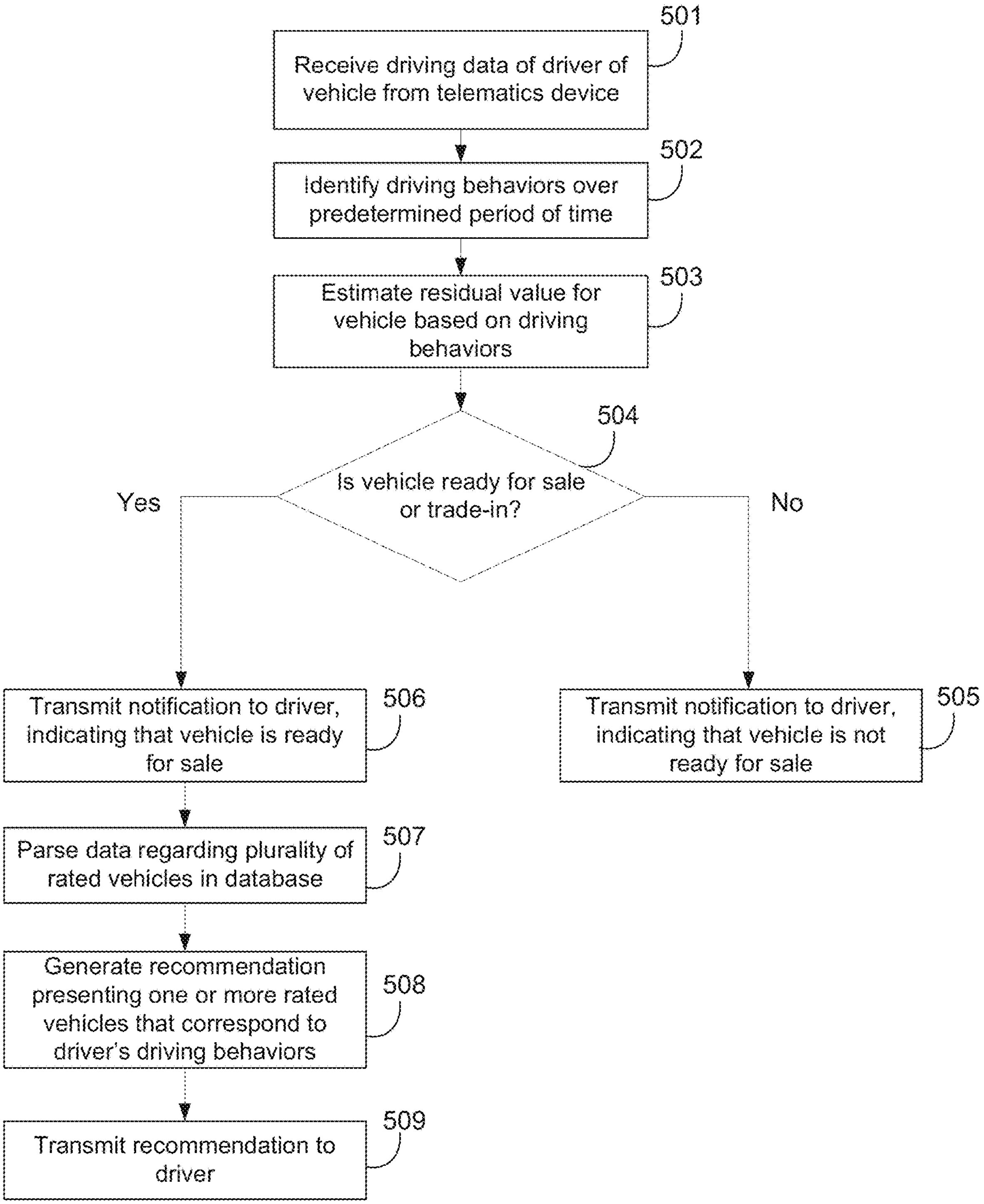
FIG. 5 depicts a flow diagram of example method steps for identifying when vehicles are ready for sale or trade-in and estimating residual values of rated vehicles in accordance with one or more example embodiments.

FIG. 5 illustrates a flow diagram of an example method in accordance with aspects of the present disclosure. In particular, FIG. 5 illustrates example method steps for identifying a driver's driving behaviors, estimating a residual value for the driver's vehicle, determining whether or not the driver should sell or trade in his or her vehicle based on the driving behaviors and the residual value, and providing a recommendation of one or more vehicles for purchase or lease to the driver if the vehicle is ready for sale or trade-in. The steps of FIG. 5 may be performed by subsystems, application servers, and computing devices of the vehicle rating system 202 (e.g., vehicle rating subsystem 203). One or more of the steps of FIG. 5 may be performed by executing a vehicle rating program (e.g., a vehicle rating mobile application) and/or by operating a particularly configured computing device of the vehicle rating system 202. As a result of the method of FIG. 5, a driver, at vehicle rating device 212 (e.g., and/or at mobile device 220) and associated with vehicle 217, may be provided with information regarding a residual value of the vehicle 217 and a recommendation regarding whether or not to sell or trade-in the vehicle 217.

The method of FIG. 5 may begin with step 501 of receiving driving data. For example, the vehicle rating system 202 may receive driving data for a driver of the vehicle 217. In some embodiments, the driving data of the driver of vehicle 217 may be collected over a period of time by the telematics device 222, vehicle rating device 212, or mobile device 220. Driving data may include real-time data that is collected by one or more sensors (e.g., sensors 218) coupled to the vehicle 217 while the driver is driving. For example, driving data may include vehicle telematics data, along with location information, such as GPS coordinates, indicating the geographical location of the driver in the vehicle 217. At step 502, the vehicle rating system may identify driving behaviors over the predetermined period of time based on the driving data. For example, the vehicle rating system 202 may identify one or more driving behaviors for the driver based on at least one of driving speeds, acceleration, braking, steering, miles driven, road conditions, amount of time driven, and the like. The driving behaviors may represent patterns in the driving data that are repeated over the predetermined period of time. In some embodiments, the driving behaviors may indicate whether the driver engages in speeding or driving slow, whether the driver is taking sharp turns, whether the driver brakes suddenly, and the like. In some cases, the driver may decide to lease his or her vehicle 217 instead of buying the vehicle 217. For such cases, the predetermined period of time may correspond to a period of time set by a lease agreement for the vehicle 217. In additional embodiments, the predetermined period of time may represent a billing period associated with an insurance policy of the driver or a period of time (e.g., a day, a week, a month, a year, etc.) set by an insurance provider.

At step 503, the vehicle rating system may estimate a residual value for the vehicle. For example, the vehicle rating system 202 may estimate a residual value for the vehicle 217 based on one or more driving behaviors of the driver. For example, some drivers may engage in rough driving behaviors, such as hard braking, sharp turns, inconsistent acceleration, speeding, and the like, in their purchased or leased vehicles. Other drivers may engage in safer driving behaviors, such as slow turns, driving at or below posted speed limits, safe braking, consistent acceleration, and the like, in their purchased or leased vehicles. Varying driving behaviors may affect a vehicle 217 differently (e.g., variations in wear in vehicle parts), and the value of the vehicle 217 may decrease based on how the driver drives the vehicle 217 (e.g., based on vehicle usage by the driver).

After estimating a residual value for the vehicle 217, at step 504, the vehicle rating system 202 may determine whether or not the vehicle is ready for sale or trade-in based on the residual value. For example, the vehicle rating system 202 may determine whether or not the estimated residual value of the driver's vehicle 217 is below or above a predefined threshold value. The predefined threshold value may represent a value of the vehicle that is a certain percentage of the original cost of the vehicle. For example, a driver may have initially purchased a vehicle at $25,000, and the driver may consider replacing the vehicle after 36 months (e.g., 3 years). After 36 months, the residual value of the vehicle may be 50%, in which case the vehicle may be worth $12,500. The driver may use the estimated residual value obtained from the vehicle rating system 202 to help him or her decide whether or not to replace his or her vehicle. The predefined threshold value may be set to a value above what the vehicle will be worth at the end of the lease. In other words, the vehicle rating system 202 may determine what the vehicle 217 is currently worth based on the driver's driving behaviors and determine if the vehicle 217 is worth selling or replacing based on its residual value. In some embodiments, the predefined threshold value may be based on data for an average driver and/or based on aggregated data for a plurality of drivers.

If the vehicle rating system 202 determines that the residual value of the vehicle is below or equal to the predefined threshold value, then the method in this example proceeds to step 505. At step 505, the vehicle rating system may transmit a notification to the driver indicating that the vehicle is not ready for sale or trade-in. For example, the vehicle rating system 202 may send a notification to the vehicle rating device 212 or the mobile device 220, in which the notification includes the residual value of the vehicle 217. If the vehicle rating system 202 determines that the residual value of the vehicle is above the predefined threshold value, then the method in this example proceeds to step 506. At step 506, the vehicle rating system may transmit a notification to the driver indicating that the vehicle is ready for sale or trade-in. For example, the vehicle rating system 202 may send a notification to the vehicle rating device 212 or the mobile device 220, in which the notification may include the residual value of the vehicle 217 and also inform the driver that the vehicle 217 is ready for sale or trade-in.

At step 507, the vehicle rating system may parse data regarding a plurality of rated vehicles in a database. For example, the vehicle rating system 202 may parse data regarding a plurality of rated vehicles in a vehicle ratings database (e.g., database 206) in order to identify one or more rated vehicles that the driver may be interested in leasing or purchasing. In some cases, the driver may be able to trade-in his or her current vehicle to obtain another vehicle as a part of his or her leasing agreement with a car dealership or car provider. The vehicle rating system 202 may parse data regarding rated vehicles in order to identify one or more rated vehicles that match the driver's driving behaviors. At step 508, the vehicle rating system 202 may generate a recommendation presenting one or more rated vehicles that correspond to one or more driving behaviors of the driver. After generating the recommendation, at step 509, the vehicle rating system 202 may transmit the recommendation to the driver at the vehicle rating device 212 or mobile device 220. Ultimately, the vehicle rating system 202 may be able to help a driver determine when his or her vehicle is ready for sale or ready to be traded in based on the driver's driving behaviors and also provide drivers with customized recommendations for purchasing or leasing rated vehicles.

Figure 6:
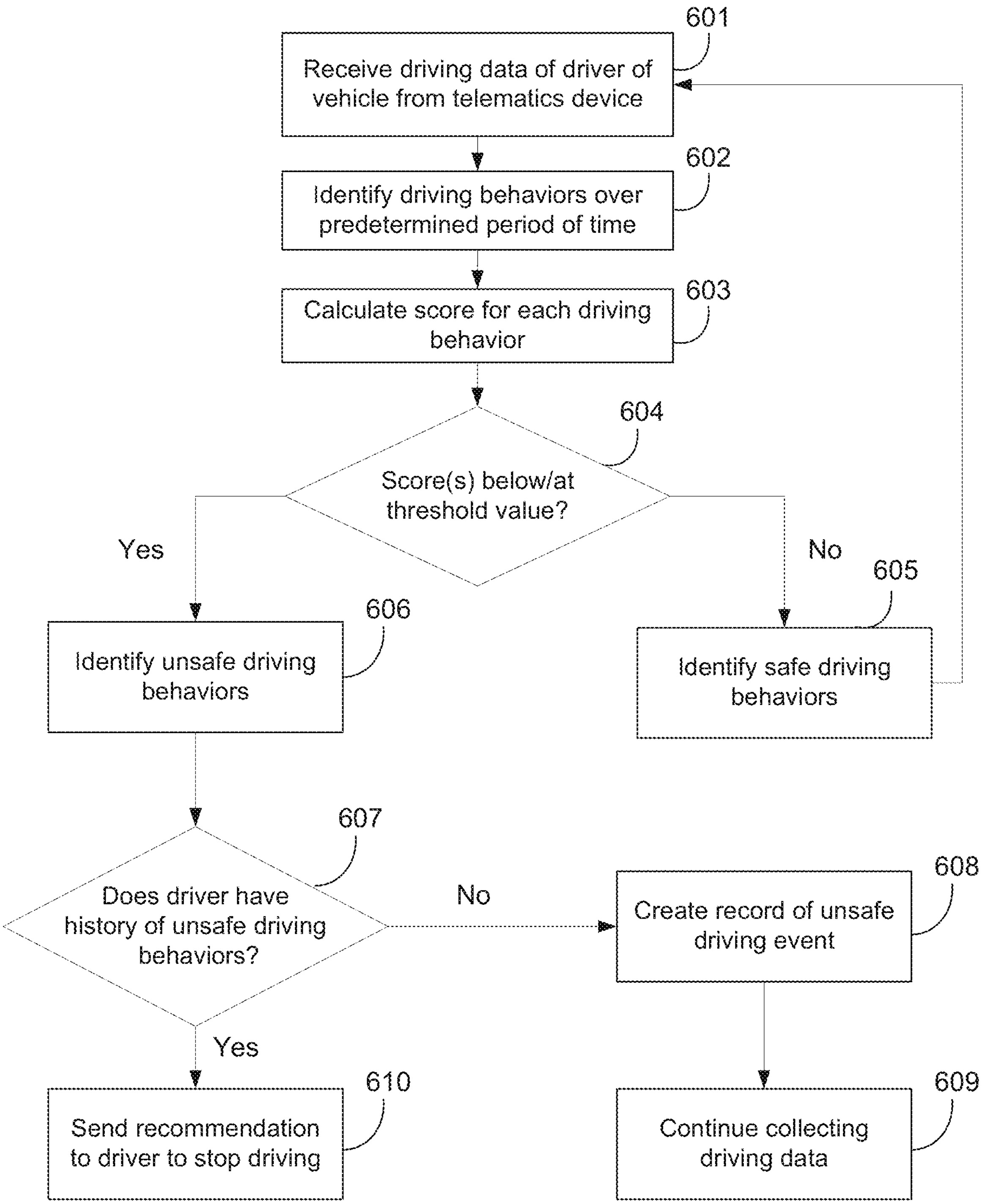
FIG. 6 depicts a flow diagram of example method steps for providing recommendations for drivers to stop driving based on unsafe driving behaviors in accordance with one or more example embodiments.

FIG. 6 illustrates a flow diagram of an example method in accordance with aspects of the present disclosure. In particular, FIG. 6 illustrates example method steps for identifying one or more driving behaviors from driving data for a driver, determining if driving behaviors are safe or unsafe, and providing recommendations to unsafe drivers to stop driving due to unsafe driving behaviors, such as resulting from physical or mental impairments. The steps of FIG. 6 may be performed by subsystems, application servers, and computing devices of the vehicle rating system 202 (e.g., vehicle rating subsystem 203). One or more of the steps of FIG. 6 may be performed by executing a vehicle rating program (e.g., a vehicle rating mobile application) and/or by operating a particularly configured computing device of the vehicle rating system 202. As a result of the method of FIG. 6, a driver, at vehicle rating device 212 (e.g., and/or at mobile device 220) and associated with vehicle 217, may be provided with a recommendation from an insurance provider or other entity implementing the systems and arrangements described herein, recommending the driver to no longer drive or to limit his or her driving (e.g., avoid highways, driving during daylight and avoid night time driving, avoid driving in inclement weather, and the like). That is, the driver may be recommended to stop or limit driving due to unsafe driving behaviors that he or she may be engaging in as the driver gets older or reaches a certain age. For example, the driver may develop vision or hearing problems which may negatively affect his or her driving ability. The vehicle rating system may allow drivers to be aware of their unsafe driving behaviors and may provide recommendations to prevent drivers who are unable to drive safely from driving.

The method of FIG. 6 may begin with a step 601 of receiving driving data. For example, the vehicle rating system 202 may receive driving data for a driver of the vehicle 217. In some embodiments, the driving data of the driver of vehicle 217 may be collected over a period of time by the telematics device 222, vehicle rating device 212, or mobile device 220. Driving data may include real-time data that is collected by one or more sensors (e.g., sensors 218) coupled to the vehicle 217 while the driver is driving. For example, driving data may include vehicle telematics data, along with location information, such as GPS coordinates, indicating the geographical location of the driver in the vehicle 217. At step 602, the vehicle rating system may identify driving behaviors over a predetermined period of time based on the driving data. For example, the vehicle rating system 202 may identify one or more driving behaviors for the driver based on at least one of driving speeds, acceleration, braking, steering, miles driven, road conditions, amount of time driven, and the like. The driving behaviors may represent patterns in the driving data that are repeated over the predetermined period of time. In some embodiments, the driving behaviors may indicate whether the driver engages in speeding or driving slow, whether the driver is taking sharp turns, whether the driver brakes suddenly, and the like. In additional embodiments, the predetermined period of time may represent a billing period associated with an insurance policy of the driver or a period of time (e.g., a day, a week, a month, a year, etc.) set by an insurance company. The vehicle rating system 202 may be able to identify how often or how frequently a driver engages in certain driving behaviors.

At step 603, the vehicle rating system may calculate scores for each of the driving behaviors of the driver. For example, the vehicle rating system 202 may calculate a score for speed, braking, steering, turn signals, miles driven, amount of time driven at night, amount of time driven during daytime, and the like. At step 603, the vehicle rating system may determine whether each score for each driving behavior is below or at a threshold value corresponding to safe driving behaviors. For example, an insurance company may set certain threshold values or predefined ranges that correspond to safe driving behaviors, and the vehicle rating system 202 may use these threshold values or predefined ranges to determine if a driver's scores are indicative of safe driving.

If one or more scores for the driving behaviors are not below or at a threshold value or within a predefined range, then the method in this example proceeds to step 605. At step 605, the vehicle rating system 202 may identify that one or more driving behaviors of the driver correspond to safe driving behaviors. In some embodiments, driving behaviors indicative of safe driving may include at least one of slow turns, driving at or below posted speed limits, safe braking, consistent acceleration, steady steering, safe lane changing, maintaining position within a lane, maintaining safe distances from other vehicles while driving, and the like. After identifying that the driver is participating in safe driving behaviors, the vehicle rating system 202 may return to step 601, at which the vehicle rating system 202 may continue to receive driving data collected by the telematics device 222 in the vehicle 217. The vehicle rating system 202 may continue monitoring the driving data until one or more unsafe driving behaviors are detected.

If one or more scores for the driving behaviors are below or at a threshold value or within a predefined range, then the method in this example proceeds to step 606. At step 606, the vehicle rating system 202 may identify that one or more driving behaviors of the driver correspond to unsafe driving behaviors. In some embodiments, driving behaviors indicative of unsafe driving may include at least one of driving below a minimum speed limit or below a posted speed limit, missing traffic signals, failing to stop at road signs, drifting into other lanes without signaling while driving, slow braking, slow reaction time to motorists or pedestrians, falling asleep while driving, and tailgating other vehicles while driving. For example, as drivers get older or reach certain ages, they may engage more often in unsafe driving behaviors, which may lead to dangerous collisions, serious injuries, and even fatalities. The vehicle rating system 202 may be able to identify such driving behaviors and recommend for such drivers to no longer drive or to limit their driving.

After identifying unsafe driving behaviors, at step 607, the vehicle rating system 202 may determine if the driver has a history of unsafe driving behaviors. For example, the driver may have a driving history that includes one or more roadside incidents (e.g., accidents, traffic stops, collisions, and the like) in which the driver has been involved. The vehicle rating system 202 may identify whether or not there are any patterns in unsafe driving behaviors for the driver or whether or not the unsafe driving behavior is a first incident in clean driving record for the driver.

If the driver does not have a history of unsafe driving behaviors, then the method in this example proceeds to step 608, at which the vehicle rating system 202 may create a record of the unsafe driving behavior. For example, the vehicle rating system 202 may create a record that the driver was engaging in switching lanes without signaling, falling asleep while driving, or another unsafe driving behavior. In some cases, the vehicle rating system 202 may store the record in a driving behaviors database (e.g., database 206) for future use. That is, the vehicle rating system 202 may consult the database at a later time to determine if the driver has a history of unsafe driving behaviors, such as a number of unsafe driving incidents above a predefined threshold. After creating and storing the recording of the unsafe driving behavior, at step 609, the vehicle rating system 202 may continue to receive driving data collected by the telematics device 222 in the vehicle 217. That is, the vehicle rating system 202 may continue monitoring the driving data until one or more unsafe driving behaviors are detected again.

If the driver has a history of unsafe driving behaviors, then the method in this example proceeds to step 610, at which the vehicle rating system 202 may send a recommendation to the driver to stop driving. For example, the vehicle rating system 202 may provide a recommendation on behalf of an insurance company, recommending that the driver no longer drive because he or she is unable to engage in safe driving behaviors. That is, the driver may be an insurance policy holder at an insurance company and may be above a certain age (e.g., above 65 years old, 70 years old, 75 years old, or the like). Based on the driver's unsafe driving behaviors, the vehicle rating system 202 may recommend that it may be time for the driver to no longer drive due to age or health reasons or to limit his or her driving. The driver may receive the recommendation at the vehicle rating device 212 or mobile device 220. In some cases, the vehicle rating system 202 may determine that a driver who repeatedly engages in unsafe driving behaviors may be ineligible for insurance coverage from an insurance policy. Thus, the recommendation sent to the driver may also include information regarding the driver's ineligibility for insurance.

In some cases, the vehicle rating system 202 may notify the driver of a residual value of the vehicle 217 and include one or more offers from third parties for selling the vehicle 217, along with the estimated residual value, in the recommendation sent to the driver. That is, the vehicle rating system 202 may be able to calculate or estimate how much the vehicle may be worth based on the driving behaviors of the driver. The vehicle rating system 202 may also be able to obtain the best offers for the driver to sell the vehicle to one or more third party entities and send the prospective offers to the driver. Thus, the driver may be able to sell his or her vehicle and make a profit when the time comes for him or her to stop driving.

FIGS. 7A, 7B, 8A, 8B, 9A, 9B, 10A, and 10B each depict an illustrative diagram of example user interfaces of a vehicle rating application 702 operating on a vehicle rating device 700 in accordance with aspects of the present disclosure. The example user interfaces may be presented on a display of a computing device, such as display 214 of vehicle rating device 212. A driver operating a vehicle, such as vehicle 217, may access a vehicle rating application 702 using a vehicle rating device 700 (e.g., at least one of the vehicle rating device 212, telematics device 222, or mobile device 220). The driver operating the vehicle rating device 700 may tap on a button or icon on the user interfaces depicted in FIGS. 7A-10B to navigate to different screens in the vehicle rating application 702.

Figure 7A:
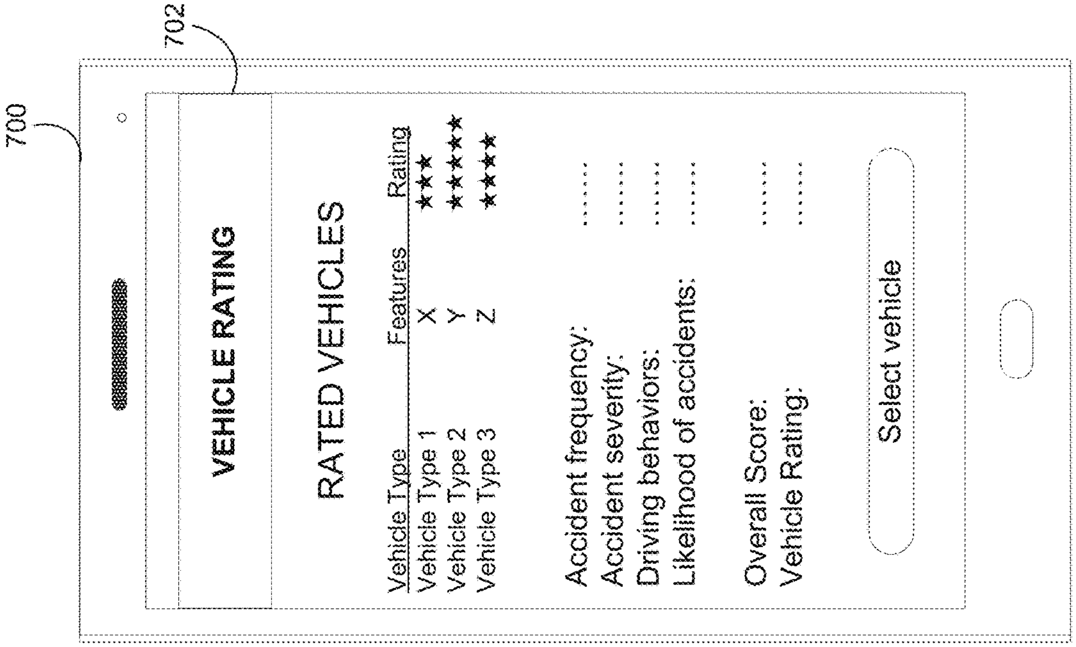
FIGS. 7A and 7B depict an illustrative diagram of example user interfaces of a vehicle rating recommendation application in accordance with one or more example embodiments.
Figure 7B:
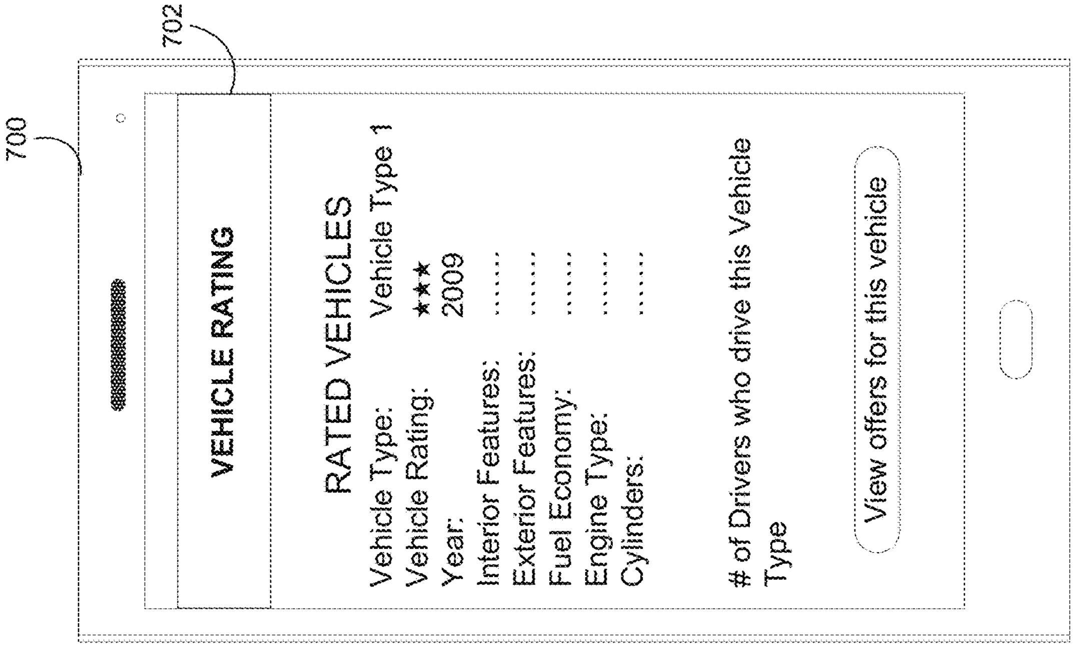

Specifically, FIGS. 7A and 7B illustrate example user interfaces of utilizing a vehicle rating application 702 to view and manage vehicle safety ratings. The user interface in FIG. 7A may depict an example of what the vehicle rating application 702 may present to a driver after assigning vehicle safety ratings to each of a plurality of vehicles. The vehicle rating application 702 may present information regarding each rated vehicle to the driver. For example, vehicle type 1, vehicle type 2, and vehicle type 3 may represent different vehicle types. In some embodiments, each type of vehicle may be the same year, make, and/or model. Each vehicle type may also vary by different trim lines or may have the same trim line, engine, options, tire size, and the like. Although only three vehicles are illustrated in the user interface in FIG. 7A, the vehicle rating application 702 may present information regarding any number of rated vehicles to the driver. In some cases, the vehicle rating application 702 may display information regarding the frequency of accidents, the severity of accidents, and the likelihood of accidents for a particular vehicle type. In some cases, the vehicle type may represent the vehicle make, vehicle model, and vehicle year of a particular vehicle. A vehicle type may be driven by a plurality of drivers, wherein the vehicle of each respective driver may be insured by an insurance company. For example, there may be hundreds of thousands of drivers who drive the same vehicle make, vehicle model, and vehicle year, such as a vehicle of vehicle type 1, described above. The vehicle rating application 702 may utilize driving data obtained from each driver to identify common driving behaviors for a plurality of drivers of a vehicle type. The vehicle rating application 702 may also be able to obtain a vehicle rating for a vehicle type that is normalized by the driving behaviors for the plurality of drivers for a vehicle type.

The user interface in FIG. 7B may depict an example of what the vehicle rating application 702 may present to a driver after the driver chooses the "Select vehicle" option depicted in the FIG. 7A user interface. For example, the vehicle rating application 702 may present detailed information regarding interior features, exterior features, vehicle quality, performance, engine power, and the like. The vehicle rating application 702 may also present the assigned vehicle safety rating for the vehicle type to the driver, in which the assigned vehicle safety rating is based on an accident frequency value, accident severity value, and driving behaviors for each driver of the vehicle type. In some embodiments, the driver may be able to select "View offers for this vehicle" in order to view one or more offers from third party entities which may be selling the vehicle.

Figure 8B:
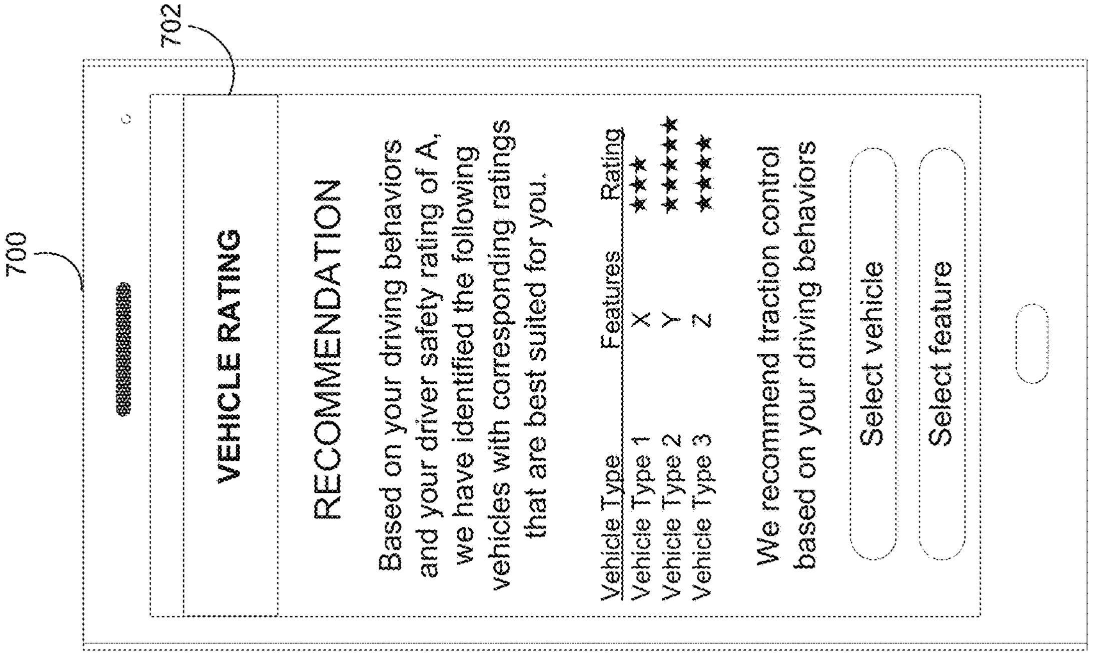
FIGS. 8A and 8B depict an illustrative diagram of example user interfaces of a vehicle rating recommendation application in accordance with one or more example embodiments.
Figure 8A:
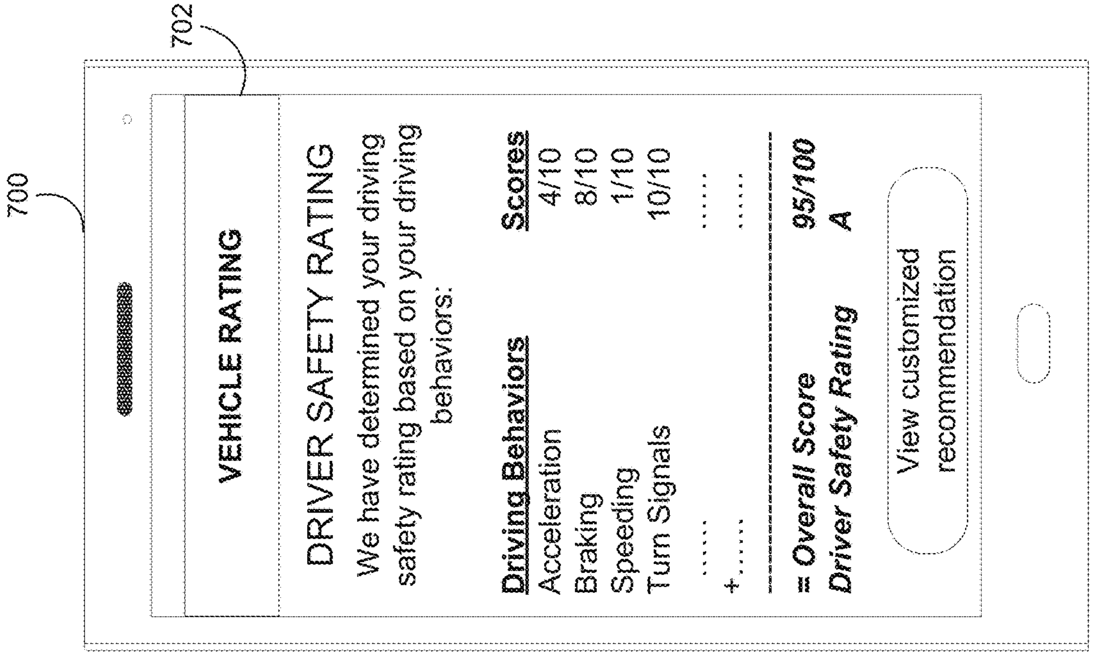

FIG. 8A and 8B illustrate example user interfaces of utilizing a vehicle rating application 702 to view and/or receive information regarding driver safety ratings and customized recommendations of one or more rated vehicles, respectively. The user interfaces in FIG. 8A and FIG. 8B each illustrate an example of a notification or recommendation that the driver associated with vehicle 217 may receive on his or her vehicle rating device 212 or mobile device 220. That is, the vehicle rating application 702 may calculate a driver safety rating for the driver based on identifying one or more driving behaviors of the driver. For example, the vehicle rating application 702 may calculate scores for each driving behavior and calculate an overall score by adding up all the driving behavior scores. In some embodiments, each driving behavior score may be on the scale of 1 to 10, 1 to 100, or any other range of values. In some embodiments, the overall driving score may be on the scale from 1 to 100 or any other range of values. Further, the vehicle rating application 702 may calculate a driver safety rating based on the overall driving score, wherein predetermined score ranges may correspond to different driver safety ratings. For example, an overall score between 90 to 100 may correspond to a driver safety rating of A, an overall score between 80 to 90 may correspond to a driver safety rating of B, an overall score between 70 to 80 may correspond to an driver safety rating of C, and so forth. Based on the driver safety rating, the vehicle rating application 702 may determine one or more rated vehicles to present in a customized recommendation to the driver.

The user interface in FIG. 8B may depict an example of what the vehicle rating application 702 may present to a driver after selecting the "View customized recommendation" option displayed in the user interface of FIG. 8A. The driver may be able to view information regarding one or more rated vehicles that match the driver's safety rating in the FIG. 8B user interface. Although only three vehicles are illustrated in the user interface in FIG. 8B, the vehicle rating application 702 may present information regarding any number of rated vehicles to the driver. In some embodiments, the vehicle rating application 702 may determine one or more rated vehicles with safety ratings that correspond to or are similar to the driver safety rating assigned to the driver based on parsing data regarding a plurality of rated vehicles. The vehicle rating application 702 may generate and present a customized recommendation to the driver, wherein the customized recommendation presents information regarding the one or more rated vehicles with safety ratings that correspond to or are similar to the driver safety rating. For example, the customized recommendation may provide information regarding each vehicle type (e.g., vehicle model, vehicle make, and year), one or more features of each vehicle type, and a vehicle safety rating assigned to each vehicle type based on the frequency of accidents, the severity of accidents, the likelihood of accidents, and the driving behaviors of each driver of the vehicle type.

In some embodiments, the vehicle rating application 702 may also present one or more features that may be of particular importance to the driver based on his or her driving behaviors. For example, a certain driver may drive faster than other drivers; thus, the vehicle rating application 702 may recommend that the driver purchase or lease a vehicle with an enhanced traction control system to prevent loss of road grip when the driver is speeding. The vehicle rating application 702 may be able to provide detailed vehicle recommendations to drivers at a granular level based on each driver's driving behaviors. Drivers may be able to use the vehicle rating application 702 to view information regarding each vehicle, by selecting the vehicle type and/or by selecting a particular feature through the options presented in the FIG. 8B user interface.

Figure 9A:
FIGS. 9A and 9B depict an illustrative diagram of example user interfaces of a vehicle rating recommendation application in accordance with one or more example embodiments.
Figure 9B:

FIG. 9A and 9B illustrate example user interfaces of utilizing a vehicle rating application 702 to view and/or receive information regarding whether or not a rated vehicle is ready for sale or trade-in. The user interfaces in FIG. 9A and FIG. 9B each illustrate an example of a notification or recommendation that the driver associated with vehicle 217 may receive on his or her vehicle rating device 212 or mobile device 220. That is, the vehicle rating application 702 may identify a driver's driving behaviors, estimate a residual value, and determine if the driver should sell or trade-in his or her vehicle 217 based on the driving behaviors and the residual value. The user interface in FIG. 9A may depict an example of what the vehicle rating application 702 may present to a driver if the driver has extensively used his or her vehicle 217 and engaged in unsafe driving behaviors. For example, the driver may have engaged in unsafe driving behaviors in the vehicle 217, such as hard braking, inconsistent acceleration, speeding, and the like. The vehicle rating application 702 may also detect that the driver's vehicle 217 has been damaged due to the driver's reckless driving behaviors. Furthermore, the vehicle rating application 702 may estimate a residual value of the vehicle 217 and provide a recommendation to the driver regarding whether or not to sell the vehicle at a certain time or in the future.

The user interface in FIG. 9B may depict an example of what the vehicle rating application 702 may present to a driver if the driver has engaged in safe driving behaviors. For example, the driver may have exhibited safe driving behaviors in the vehicle 217, such as driving at posted speed limits, making slow turns, braking safely, and the like. The vehicle rating application 702 may also detect that the driver's vehicle 217 is in good condition because of the driver's safe driving behaviors. Additionally, the vehicle rating application 702 may estimate a residual value of the vehicle 217 and provide a recommendation to the driver regarding whether or not to sell the vehicle at a certain time or in the future.

Figure 10B:
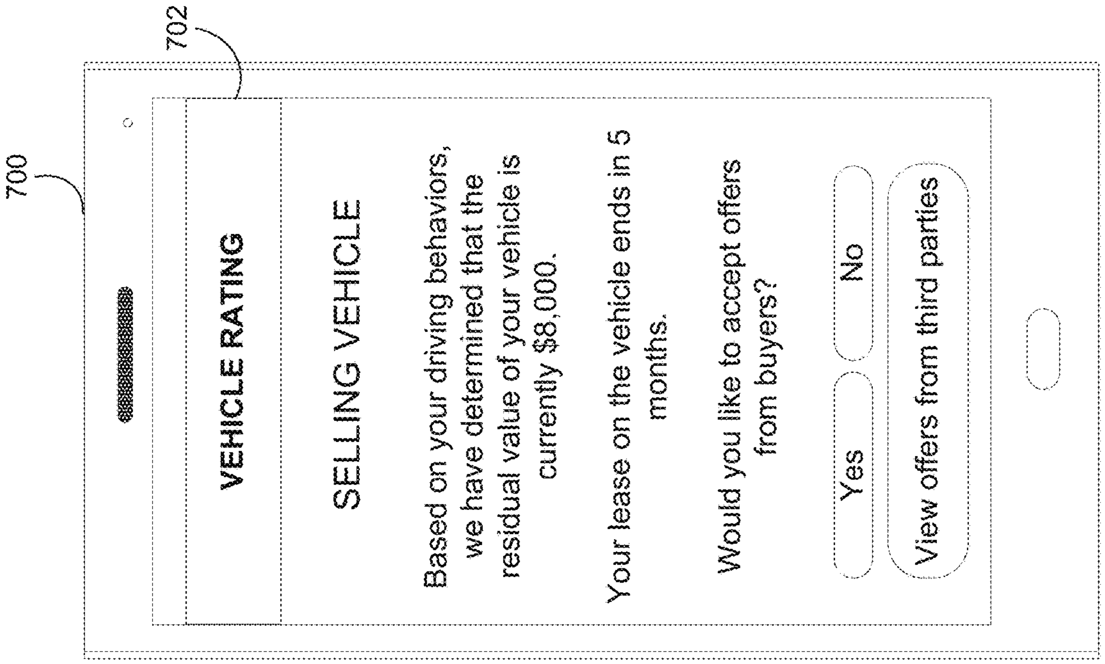
FIGS. 10A and 10B depict an illustrative diagram of example user interfaces of a vehicle rating recommendation application in accordance with one or more example embodiments.
Figure 10A:
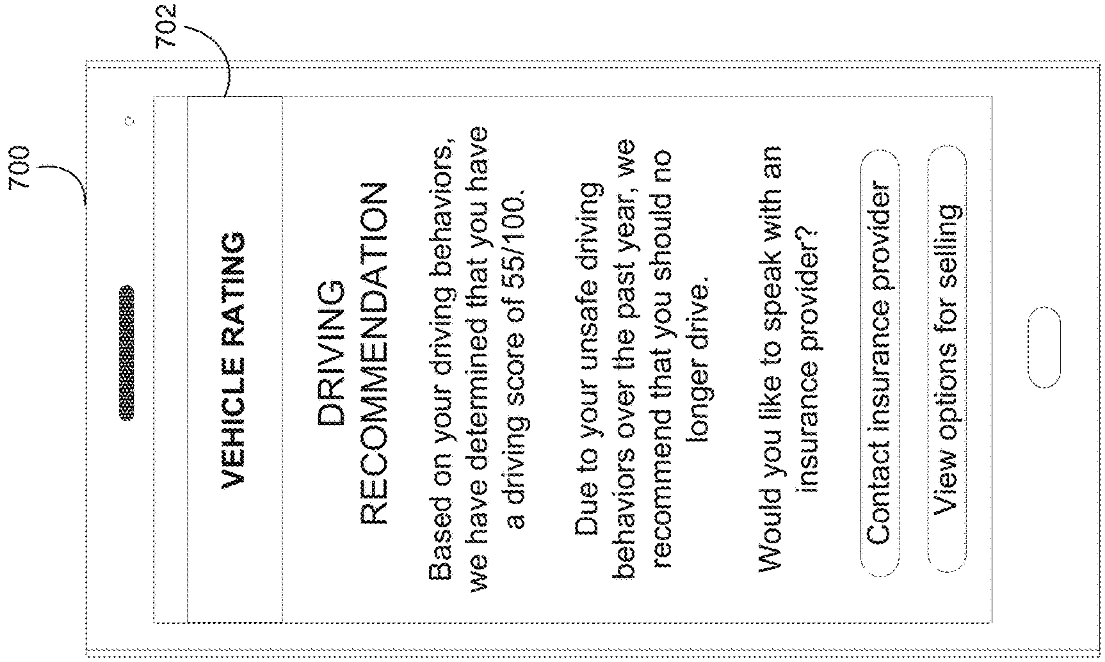

FIGS. 10A and 10B illustrate example user interfaces of utilizing a vehicle rating application 702 to view and/or receive driving recommendations for drivers and options for selling vehicles, respectively. The user interface in FIG. 10A illustrates an example of a notification or recommendation that the driver associated with vehicle 217 may receive on his or her vehicle rating device 212 or mobile device 220. That is, the vehicle rating application 702 may calculate a driving score for the driver based on identifying one or more unsafe driving behaviors of the driver. For example, the vehicle rating application 702 may determine that the driver has a overall driving score that is below a "passing grade" (e.g., a 70/100) or below a predefined threshold and determine that the driver of vehicle 217 has a history of unsafe driving behaviors. Based on the driver's unsafe driving behaviors and driving history, the vehicle rating application 702 may provide a recommendation to the driver, recommending that the driver should no longer be driving, such as for health reasons. The driver may be able to speak with an insurance provider regarding the recommendation by selecting the "Contact insurance provider" option displayed in the FIG. 10A user interface in order to discuss the driver's options regarding the recommendation. After receiving the recommendation from the vehicle rating application 702 to stop driving, the driver may also select the "View options for selling" option displayed in the FIG. 10A user interface in order to figure out if he or she wants to sell his or her vehicle.

The user interface in FIG. 10B may depict an example of what the vehicle rating application 702 may present to a driver after selecting the "View options for selling" option displayed in the FIG. 10A user interface. In some embodiments, the vehicle rating application 702 may estimate a residual value of the driver's vehicle 217, in which the residual value may represent what the vehicle 217 is currently worth based on the driver's driving behaviors. For example, the driver may have leased his or her vehicle for a certain period of time (e.g., 6 months, 12 months, 24 months, or another period of time), and the monetary value of the vehicle 217 may have decreased based on the driver's usage of the vehicle 217. Thus, the vehicle rating application 702 may present the current value of the vehicle to the driver, along with information regarding the driver's vehicle lease. The vehicle rating application 702 may also provide one or more offers for the driver to sell the vehicle 217 to various third parties. That is, the vehicle rating application 702 may also be able to present the best offers for the driver to sell the vehicle to one or more third party entities and send the prospective offers to the driver. The driver may be able to view information regarding the offers and/or accept an offer through the options presented in the FIG. 10B user interface.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
- a telematics device associated with a vehicle having one or more sensors;
- a first computing device associated with a driver of the vehicle;
- a database configured to store data regarding a plurality of rated vehicles; and
- a driving behaviors analysis server including a processor and memory, the driving behaviors analysis server configured to:
  - receive, via the telematics device, driving data of the driver;
  - identify one or more driving behaviors of the driver based on the driving data;
  - assign a driver safety rating to the driver based on the one or more driving behaviors;
  - parse the data regarding the plurality of rated vehicles in the database to determine whether the driver safety rating corresponds to any of the plurality of rated vehicles; and
  - when the driver safety rating is determined to correspond to one or more of the plurality of rated vehicles, generate a customized recommendation with the one or more of the plurality of rated vehicles, a safety rating of each of the one or more of the plurality of rated vehicles, and the driver safety rating and transmit the customized recommendation to the first computing device associated with the driver.

2. The system of claim 1, wherein,
- the driving data includes real-time data collected by the one or more sensors while the driver is driving, and
- the one or more driving behaviors of the driver are based on at least one of driving speeds, acceleration, braking, steering, miles driven, road conditions, or amount of time driven.

3. The system of claim 1, wherein the driving behaviors analysis server is further configured to:
- calculate a score for each of the one or more driving behaviors of the driver;
- assign an overall driving score for the driver based on the score for each of the one or more driving behaviors;

determine the overall driving score to be within a predetermined score range of a plurality of predetermined score ranges; and assign, to the driver, the driver safety rating corresponding to the predetermined score range of the plurality of predetermined score ranges.

4. The system of claim 1, wherein the driving behaviors analysis server is further configured to:

receive data regarding a plurality of vehicles;

classify each vehicle in the plurality of vehicles by vehicle type; and assign a safety rating to each vehicle type in the plurality of vehicles based on one or more vehicle features, frequency of accidents, severity of accidents, and likelihood of accidents for a plurality of drivers for each vehicle type, resulting in the plurality of rated vehicles.

5. The system of claim 1, wherein the driving behaviors analysis server is further configured to:

associate a first subset of a plurality of drivers with the driver based on at least a corresponding one of the one or more driving behaviors; and identify a subset of the plurality of rated vehicles associated with the first subset of the plurality of drivers.

6. The system of claim 1, wherein, the driving behaviors analysis server is further configured to receive, from the first computing device, a request for information comprising one or more preferences of the driver regarding a new vehicle for lease or purchase by the driver, the customized recommendation is based on the one or more preferences of the driver, and the customized recommendation indicates features for each of the plurality of rated vehicles.

7. The system of claim 1, wherein, the driving behaviors analysis server is further configured to identify safe driving behaviors indicative of safe driving, the safe driving behaviors include at least one of slow turns, driving at or below posted speed limits, safe braking, consistent acceleration, steady steering, safe lane changing, or maintaining safe distances from other vehicles while driving, and the driving behaviors analysis server is further configured to assign a driver safety rating of a first level based on the safe driving behaviors.

8. An apparatus comprising:

at least one processor;

a network interface configured to communicate, via a network, with a telematics device associated with a vehicle having one or more sensors and a first computing device associated with a driver; and a memory storing computer-readable instructions that, when executed by the at least one processor, cause the apparatus to:

receive, via the telematics device, driving data of the driver;

identify one or more driving behaviors of the driver based on the driving data;

assign a driver safety rating to the driver based on the one or more driving behaviors;

parse data regarding a plurality of rated vehicles to determine whether the driver safety rating corresponds to any of the plurality of rated vehicles; and when the driver safety rating is determined to correspond to one or more of the plurality of rated vehicles, generate a customized recommendation with the one or more of the plurality of rated vehicles, a safety rating of each of the one or more of the plurality of rated vehicles, and the driver safety rating, and transmit the customized recommendation to the first computing device associated with the driver.

9. The apparatus of claim 8, wherein the driving data comprises real-time data that is collected by the one or more sensors arranged in the vehicle while the driver is driving, and wherein the driving behaviors for the driver are based on at least one of driving speeds, acceleration, braking, steering, miles driven, road conditions, and amount of time driven.

10. The apparatus of claim 8, wherein the instructions, when executed by the at least one processor, further cause the apparatus to:

calculate a score for each of the one or more driving behaviors of the driver;

assign an overall driving score for the driver based on the score for each of the one or more driving behaviors;

determine the overall driving score to be within a predetermined score range of a plurality of predetermined score ranges; and assign, to the driver, the driver safety rating corresponding to the predetermined score range of the plurality of predetermined score ranges.

11. The apparatus of claim 8, wherein the instructions, when executed by the at least one processor, further cause the apparatus to:

receive data regarding a plurality of vehicles;

classify each vehicle in the plurality of vehicles by vehicle type; and assign a safety rating to each vehicle type in the plurality of vehicles based on one or more vehicle features, frequency of accidents, severity of accidents, and likelihood of accidents for a plurality of drivers for each vehicle type, resulting in the plurality of rated vehicles.

12. The apparatus of claim 8, wherein the instructions, when executed by the at least one processor, further cause the apparatus to:

associate a first subset of a plurality of drivers with the driver based on at least a corresponding one of the one or more driving behaviors; and identify a subset of the plurality of rated vehicles associated with the first subset of the plurality of drivers.

13. The apparatus of claim 8, wherein the instructions, when executed by the at least one processor, further cause the apparatus to:

receive, from the first computing device, a request for information comprising one or more preferences of the driver regarding a new vehicle for lease or purchase by the driver; and generating the customized recommendation for the driver based on the one or more preferences of the driver, wherein the customized recommendation indicates features for each of the plurality of rated vehicles.

14. A method comprising:

receiving, from a telematics device associated with a vehicle having one or more sensors driving data of a driver of the vehicle;

identifying, by one or more computing devices, one or more driving behaviors of the driver based on the driving data;

assigning, by the one or more computing devices, a driver safety rating to the driver based on the one or more driving behaviors;

parsing data regarding a plurality of rated vehicles to determine whether the driver safety rating corresponds to any of the plurality of rated vehicles; and when the driver safety rating is determined to correspond to one or more of the plurality of rated vehicles, generating, by the one or more computing devices, a customized recommendation with one or more of the plurality of rated vehicles, a safety rating of each of the one or more of the plurality of rated vehicles, and the driver safety rating, and transmitting, by the one or more computing devices, the customized recommendation to the driver.

15. The method of claim 14, wherein the driving data comprises real-time data that is collected by the one or more sensors arranged in the vehicle while the driver is driving, and wherein the driving behaviors for the driver are based on at least one of driving speeds, acceleration, braking, steering, miles driven, road conditions, and amount of time driven.

16. The method of claim 14, wherein assigning the driver safety rating further comprises:

calculating a score for each of the one or more driving behaviors of the driver;

assigning an overall driving score for the driver based on the score for each of the one or more driving behaviors;

determining the overall driving score to be within a predetermined score range of a plurality of predetermined score ranges; and assigning, to the driver, the driver safety rating corresponding to the predetermined score range of the plurality of predetermined score ranges.

17. The method of claim 14, further comprising:

receiving data regarding a plurality of vehicles;

classifying each vehicle in the plurality of vehicles by vehicle type; and assigning a safety rating to each vehicle type in the plurality of vehicles based on one or more vehicle features, frequency of accidents, severity of accidents, and likelihood of accidents for a plurality of drivers for each vehicle type, resulting in the plurality of rated vehicles.

18. The method of claim 14, further comprising:

associating a first subset of a plurality of drivers with the driver based on at least a corresponding one of the one or more driving behaviors; and identifying a subset of the plurality of rated vehicles associated with the first subset of the plurality of drivers.

19. The method of claim 14, further comprising:

receiving, by the one or more computing devices, a request for information comprising one or more preferences of the driver regarding a new vehicle for lease or purchase by the driver; and generating the customized recommendation for the driver based on the one or more preferences of the driver, wherein the customized recommendation indicates features for each of the plurality of rated vehicles.

20. The method of claim 14, further comprising:

identifying, by the one or more computing devices, safe driving behaviors indicative of safe driving, the safe driving behaviors including at least one of slow turns, driving at or below posted speed limits, safe braking, consistent acceleration, steady steering, safe lane changing, or maintaining safe distances from other vehicles while driving; and assigning a driver safety rating of a first level based on the safe driving behaviors.

* * * * *